United States Patent
Hwang et al.

(10) Patent No.: US 9,913,093 B2
(45) Date of Patent: Mar. 6, 2018

(54) APPARATUS AND METHOD FOR MEASURING POSITION

(71) Applicants: Samsung Electronics Co., Ltd., Suwon-si, Gyeonggi-do (KR); Research & Business Foundation SUNGKYUNKWAN UNIVERSITY, Suwon-si, Gyeonggi-do (KR)

(72) Inventors: Wonjun Hwang, Suwon-si (KR); Hyung-Jin Choi, Seoul (KR); Kyunghoon Lee, Suwon-si (KR); Hyunseok Ryu, Yongin-si (KR); Dong Hun Lee, Gwacheon-si (KR); Min Jang, Seongnam-si (KR); Han Jun Kim, Seoul (KR)

(73) Assignees: Samsung Electronics Co., Ltd., Suwon-si (KR); Research & Business Foundation SUNGYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 15/355,740

(22) Filed: Nov. 18, 2016

(65) Prior Publication Data
US 2017/0150314 A1  May 25, 2017

(30) Foreign Application Priority Data
Nov. 25, 2015 (KR) .......................... 10-2015-0165880

(51) Int. Cl.
*H04W 24/00* (2009.01)
*H04W 4/02* (2018.01)
(Continued)

(52) U.S. Cl.
CPC ............... *H04W 4/023* (2013.01); *G01S 5/00* (2013.01); *H04W 4/06* (2013.01); *H04W 64/00* (2013.01);
(Continued)

(58) Field of Classification Search
CPC ..... H04W 4/023; H04W 76/023; H04W 4/06; H04W 72/0446; H04W 64/00; G01S 5/00
See application file for complete search history.

(56) References Cited

U.S. PATENT DOCUMENTS 9,049,680 B2   6/2015  Krishnamurthy et al.
2015/0011240 A1*  1/2015  Xiao ........................ G01S 5/10
                                                                      455/456.1
(Continued)

*Primary Examiner* — Ajit Patel
(74) *Attorney, Agent, or Firm* — Jefferson IP Law, LLP

(57) ABSTRACT

An apparatus of a user equipment (UE) for supporting a higher data rate than a 4G communication system is provided. The apparatus includes a transceiver and a processor operatively coupled with the transceiver. The processor is configured to broadcast a request signal for positioning the UE, receive response signals corresponding to the request signal from a plurality of UEs, based on received signal timings of the response signals and timing advance (TA) values of the plurality of UEs, select one of at least one UE set which is classified based on a distance from the UE, select three UEs from the selected set based on the TA values such that a triangular area comprising the three UEs as vertices covers the UE, and generate position information of the UE based on distances between the three UEs and the UE.

20 Claims, 33 Drawing Sheets

(51) Int. Cl.
*H04W 4/06* (2009.01)
*H04W 72/04* (2009.01)
*H04W 76/02* (2009.01)
*G01S 5/00* (2006.01)
*H04W 64/00* (2009.01)

(52) U.S. Cl.
CPC ..... *H04W 72/0446* (2013.01); *H04W 76/023* (2013.01)

(56) References Cited

U.S. PATENT DOCUMENTS

| | | |
|---|---|---|
| 2015/0018010 A1 | 1/2015 | Fischer |
| 2015/0045017 A1* | 2/2015 | Patil ............... H04L 5/0037 455/426.1 |
| 2015/0304911 A1* | 10/2015 | Wang ............ H04W 36/0088 370/331 |
| 2016/0119759 A1* | 4/2016 | Azih ................ H04W 4/008 455/456.1 |
| 2016/0192420 A1* | 6/2016 | Kim ................ H04W 74/00 370/329 |
| 2016/0278003 A1* | 9/2016 | Kim ................ H04W 48/16 |
| 2016/0278068 A1* | 9/2016 | Chen ............... H04W 76/023 |

\* cited by examiner

APPARATUS AND METHOD FOR MEASURING POSITION

CROSS-REFERENCE TO RELATED APPLICATION(S)

This application claims the benefit under 35 U.S.C. § 119(a) of a Korean patent application filed on Nov. 25, 2015 in the Korean Intellectual Property Office and assigned Serial number 10-2015-0165880, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd., and 2) Research & Business Foundation SUNGKYUNKWAN UNIVERSITY.

TECHNICAL FIELD

The present disclosure relates to position measurement using other user equipments (UEs) in a wireless communication system.

BACKGROUND

To satisfy a wireless data traffic demand which gradually grows after a $4^{th}$ generation (4G) communication system is commercialized, efforts are exerted to develop an advanced 5th generation (5G) communication system or a pre-5G communication system. The 5G communication system or the pre-5G communication system is referred to as a beyond 4G network communication system or a post long term evolution (LTE) system.

To achieve a high data transfer rate, the 5G communication system considers its realization in an extremely high frequency (mmWave) band (e.g., 60 GHz band). To mitigate a path loss of propagation in the extremely high frequency band and to extend a propagation distance, the 5G communication system is discussing beamforming, massive multiple input multiple output (MIMO), full dimensional (FD)-MIMO, an array antenna, analog beamforming, and a large scale antenna.

To improve a system network, the 5G communication system is developing an evolved small cell, an advanced small cell, a cloud radio access network (RAN), an ultra-dense network, a device to device (D2D) communication, a wireless backhaul, a moving network, cooperative communication, coordinated multi-points (CoMP), and interference cancellation.

Besides, the 5G system is working on hybrid frequency shift keying (FSK) and quadrature amplitude modulation (QAM) modulation (FQAM) and sliding Window superposition coding (SWSC) as advanced coding modulation (ACM), and filter bank multi carrier (FBMC), non-orthogonal multiple access (NOMA), and sparse code multiple access (SCMA) as advanced access technologies.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for measuring a position using other user equipments (UEs).

In accordance with an aspect of the present disclosure, a method for operating a UE is provided. The method includes broadcasting a request signal for positioning the UE, receiving response signals corresponding to the request signal from a plurality of UEs, based on received signal timings of the response signals and timing advance (TA) values of the plurality of UEs, selecting one of at least one UE set which is classified based on a distance from the UE, selecting three UEs from the selected set based on the TA values such that a triangular area comprising the three UEs as vertices covers the UE, and generating position information of the UE based on distances between the three UEs and the UE.

In accordance with another aspect of the present disclosure, a method is provided. The method includes operating a UE broadcasting a device to device (D2D) discovery signal for positioning the UE, receiving response signals corresponding to the D2D discovery signal from a plurality of UEs, based on a reference signal received power (RSRP) of the response signals and a receive power of the response signals, selecting one of at least one UE set which is classified based on a distance from the UE, selecting three UEs from the selected set based on the transmit power of the response signal such that a triangular area comprising the three UEs as vertices covers the UE, and generating position information of the UE based on distances between the three UEs and the UE, wherein the RSRP is an average power received from a single reference signal resource element.

In accordance with another aspect of the present disclosure, an apparatus of a UE is provided. The apparatus includes a transceiver and a processor operatively coupled with the transceiver. The processor is configured to broadcast a request signal for positioning the UE, receive response signals corresponding to the request signal from a plurality of UEs, based on received signal timings of the response signals and TA values of the plurality of UEs, select one of at least one UE set which is classified based on a distance from the UE, select three UEs from the selected set based on the TA values such that a triangular area comprising the three UEs as vertices covers the UE, and generate position information of the UE based on distances between the three UEs and the UE.

In accordance with another aspect of the present disclosure, an apparatus of a UE is provided. The apparatus includes a transceiver and a processor operatively coupled with the transceiver. The processor is configured to broadcast a D2D discovery signal for positioning the UE, receive response signals corresponding to the D2D discovery signal from a plurality of UEs, based on a RSRP of the response signal and a receive power of the response signal, select one of at least one UE set which is classified based on a distance from the UE, select three UEs from the selected set based on the transmit power of the response signal such that a triangular area comprising the three UEs as vertices covers the UE, and generate position information of the UE based on distances between the three UEs and the UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
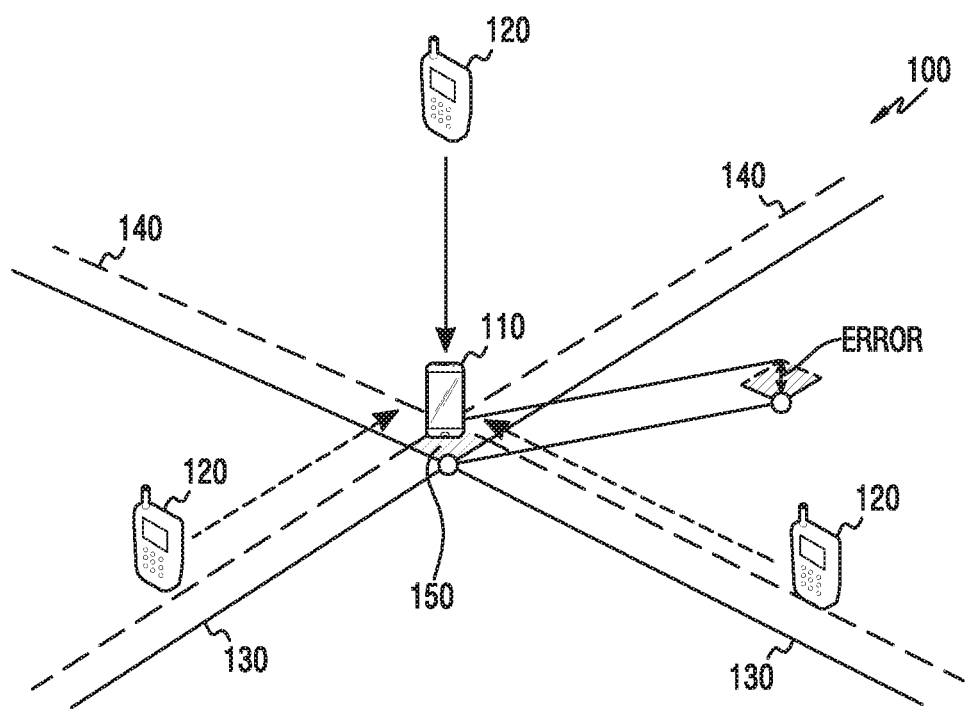
FIG. 1 is a diagram of an example of user equipment (UE) positioning using trilateration according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein is for the purpose of describing embodiments only and is not intended to be limiting. As used herein, the singular forms are intended to include plural forms as well, unless the context clearly indicates otherwise. The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology. As long as the terms are not defined obviously, they are not ideally or excessively analyzed as formal meanings. In some cases, terms defined in the present disclosure cannot be construed as excluding embodiments of the present disclosure.

In embodiments of the present disclosure described below, a hardware approach will be described as an example. However, since the embodiments of the present disclosure include a technology using both hardware and software, the present disclosure does not exclude a software-based approach.

Various embodiments of the present disclosure provide an apparatus and a method for measuring a position in a wireless communication system.

In the following explanation, terms indicating control information, terms indicating network entities, terms indicating messages, and terms indicating components of a device can be used to ease the understanding. Accordingly, the present disclosure is not limited to the terms to be described, and can replace them with other terms indicating objects having technically identical meaning.

To ease the understanding, some terms and names defined in 3rd generation partnership project (3GPP) long term evolution (LTE) standard can be used. The present disclosure is not limited to those terms and names, and can be equally applied to systems conforming to other standards.

The present disclosure provides positioning of a user equipment (UE) in a wireless communication system. The present disclosure can provide an apparatus and a method for calculating a distance between UEs using a timing difference of signals received from device to device (D2D) proximity service (hereafter, referred to as a D2D service) devices. The present disclosure can provide an apparatus and a method for determining adequate D2D service UEs for trilateration-based positioning using the calculated distances between the UEs. The D2D service can indicate traffic exchange through links between UEs without using an existing infrastructure. The D2D service can include sidelink communication and sidelink discovery defined in 3GPP technical specification (TS) 36.331. Hereafter, a D2D UE can indicate a UE capable of executing the D2D service.

With advances in a wireless communication technology, wireless communication users are rapidly increasing. In this respect, for public safety of the wireless communication users, federal communications commission (FCC) suggests high-level requirements regarding user positioning. Hence, 3GPP which leads the wireless communication technology standardization is working on various positioning methods to meet the requirements of FCC.

When an evolved NodeB (eNB) is used to position a UE, an error can be caused by signal to noise ratio (SNR) decrease based on a distance between the UE and the eNB and an error can be caused by a non-line-of-sight (NLOS) signal. To reduce such errors, a positioning method using the D2D service can be considered. The positioning method using the D2D service can measure a position using links between UEs. The positioning method using the D2D service can reduce power consumption of the UE and the NLOS by conducting a relatively short-range communication. The positioning method using the D2D service can easily obtain a plurality of reference nodes for the positioning as the number of UEs increases and thus achieve more accurate positioning than a positioning method using the eNB.

The UE according to various embodiments can measure its position using at least three or more D2D UEs near the UE. The UE positioning method can use a D2D service demodulation reference signal (DMRS) which is one of constant amplitude Zero auto-correlation (CAZAC) sequences transmitted from the D2D UEs. The UE can estimate a propagation delay from a received signal timing measurement value of the DMRS received from the D2D UEs. The UE can upload the estimated propagation delay to a location server such as an evolved serving mobile location centre (E-SMLC) through LTE positioning protocol (LPP). The E-SMLC can fulfill the positioning using a trilateration which estimates a geometric position of the UE based on the D2D UE positions and the measured propagation delay. For example, the positioning can include time of arrival (TOA), time difference of arrival (TDOA), and the like.

The TDOA-based positioning can calculate a received signal time difference (RSTD) of reference signals by using the DMRS from the D2D UE as the reference signal based on Equation 1.

$$RSTD_{i,j} = (T_i + \tau_i) - (T_j + \tau_j)$$ Equation 1

$RSTD_{i,j}$ can denote the RSTD of the reference signals, and i,j can denote an index for identifying a particular D2D UE. $T_i$ can denote a time offset of an eNB which serves a D2D UE, $T_j$ can denote a time offset of an eNB which serves another D2D UE, and $\tau_i$ and $\tau_j$ can be determined by the propagation delay. The UE can measure and upload two or more different RSTDs to the location server. The location server can obtain, as a hyperbolic function, a geometric distance difference between the UE and the D2D UE from the RSTDs. The UE can estimate its position from an intersection of the obtained hyperbolic functions.

FIG. 1 depicts UE positioning using trilateration according to an embodiment of the present disclosure.

Referring to FIG. 1, a system 100 can include a UE 110 and UEs 120. The UE 110 can require positioning. The UEs 120 can assist in the positioning of the UE 110. Hereafter, to ease the understanding, the UEs 120 can be referred to as a single UE. The UE 120 can be a D2D UE. An RSTD calculated based on a DMRS transmitted from the UE 120 directly to the UE 110 can produce a hyperbolic curve 130. Due to an RSTD error resulting from a propagation delay, the hyperbolic curve 130 can differ from a hyperbolic curve 140 based on an actual UE position. In the system 100, the UE 120 can be uniformly distributed around the UE 110. As the UE 120 is uniformly distributed around the UE 110, the hyperbolic curve 130 can have a low curvature. When the hyperbolic curve 130 has a low curvature, an error area 150 between the hyperbolic curve 130 and the hyperbolic curve 140 can relatively narrow. In other words, as the UE 120 is uniformly distributed around the UE 110, the trilateration positioning can achieve high performance.

Figure 2:
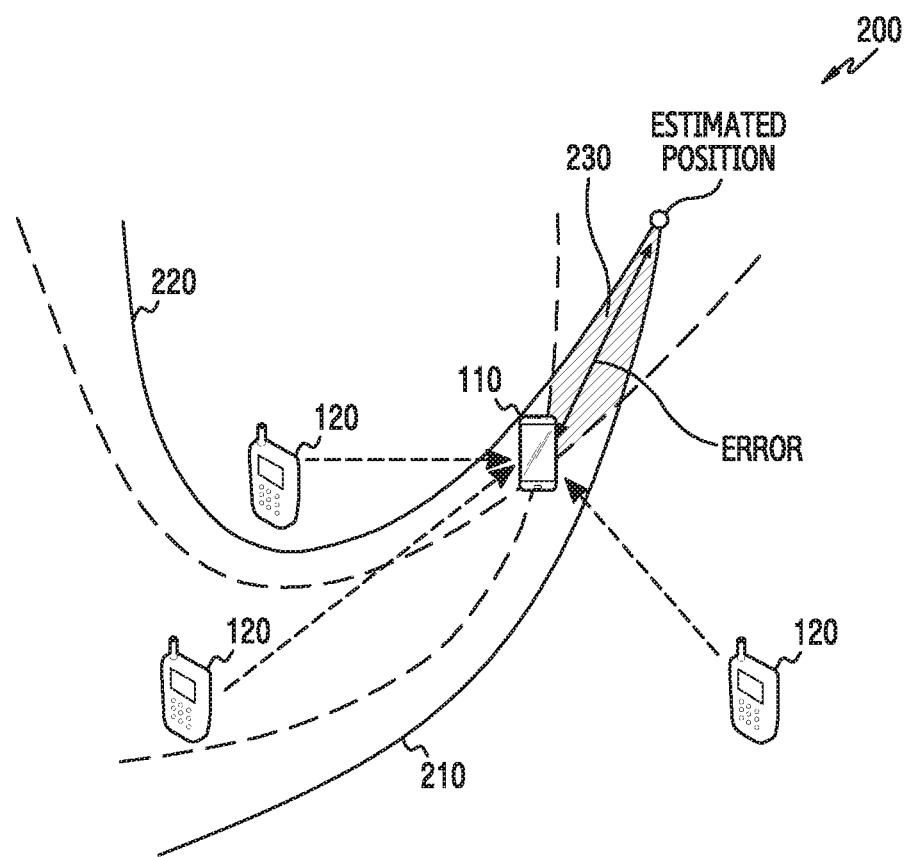
FIG. 2 is a diagram of another example of UE positioning using trilateration according to an embodiment of the present disclosure.

FIG. 2 depicts another example of UE positioning using trilateration according to an embodiment of the present disclosure.

Referring to FIG. 2, a system 200 can include a UE 110 and a UE 120. The UE 110 can require positioning. The UE 120 can assist in the positioning of the UE 110. The UE 120 can be a D2D UE. An RSTD calculated based on a DMRS transmitted from the UE 120 directly to the UE 110 can produce a hyperbolic curve 210. Due to an RSTD error resulting from a propagation delay, the hyperbolic curve 210 can differ from a hyperbolic curve 220 based on an actual UE position. In the system 200, the UE 120 can be unevenly distributed around the UE 110. As the UE 120 is unevenly distributed around the UE 110, the hyperbolic curve 210 can have a high curvature. When the hyperbolic curve 210 has a high curvature, an error area 230 between the hyperbolic curve 210 and the hyperbolic curve 220 can relatively widen. In other words, as the hyperbolic curve 210 is unevenly distributed around the hyperbolic curve 220, the trilateration positioning performance can greatly deteriorate.

As shown in FIG. 1 and FIG. 2, for the accurate positioning, it is important to select an adequate UE from the D2D UEs around the UE to be positioned.

An apparatus and an operating method of a UE according to various embodiments can select adequate D2D UEs for trilateration-aided positioning by locating the UE and the D2D UEs. The apparatus and the operating method of the UE can use timing advance (TA) values (a time offset for an uplink (UL) signal of each UE) indicating distances of the UE and the D2D UEs and distances of the eNB and the UEs. The apparatus and the operating method of the UE can measure the UE position by use of the TA values and the trilateration with high accuracy.

The TA value of the UE can be included in scheduling assignment (SA) of a physical sidelink control channel (PSCCH) signal. The TA value can indicate time information for synchronizing the UEs with the eNB based on the distances between the UEs and the eNB. Hence, the TA value can indicate the distance between the eNB and each UE. The UE and the D2D UEs can perform UL synchronization (e.g., random access (RA)) to initiate communication with the eNB. The UE and the D2D UEs can perform synchronization (e.g., synchronization using a sidelink synchronization signal) to initiate their D2D communication (or discovery). In the D2D communication (or discovery), the UE and the D2D UEs can recognize the mutual TA value.

Figure 3:
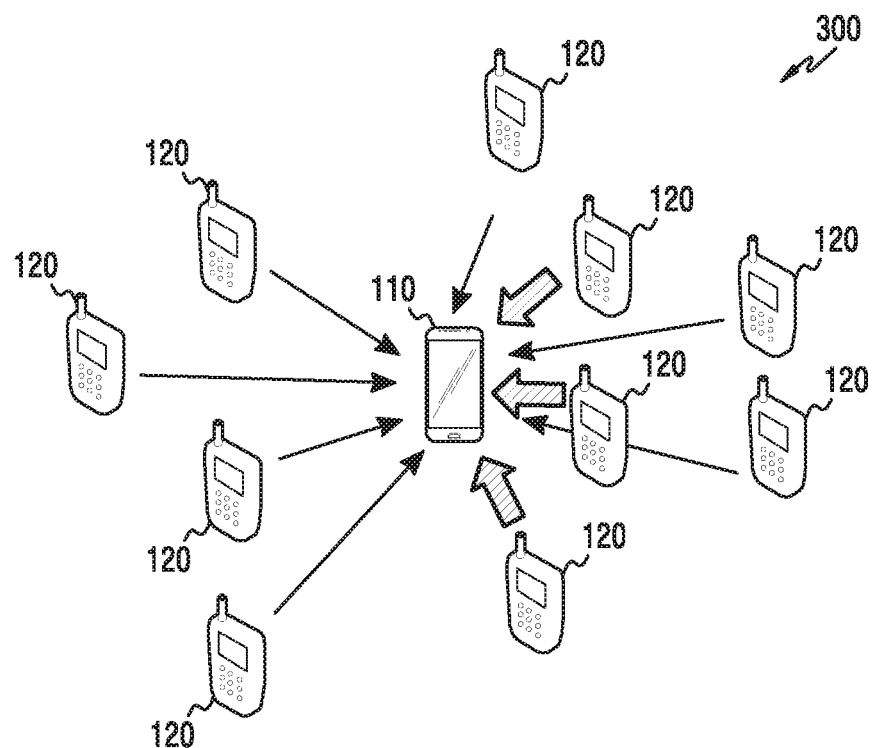
FIG. 3 is a diagram of an example of UE positioning by selecting neighboring UEs having the greatest receive power according to an embodiment of the present disclosure.

FIG. 3 depicts an example of UE positioning by selecting neighboring UEs having the greatest receive power according to an embodiment of the present disclosure.

Referring to FIG. 3, a system 300 can include a UE 110 and a UE 120. The UE 110 can require positioning. The UE 120 can assist in the positioning of the UE 110. The UE 120 can be a D2D UE. To reduce power attenuation of a DMRS transmitted by the UE 120, the UE 110 can select three UEs 120 closest to the UE 110, as reference UEs. The reference UE can assist in the positioning of the UE 110. The reference UE can be selected for the positioning of the UE 110. The UE 110 can select three UEs 120 having the greatest DMRS power as the reference UEs. Such selection can enhance the positioning performance during receive signal detection of the UE 110. However, since the UE is mobile, D2D UEs may not be uniformly distributed. When selecting the three UEs 120 having the greatest DMRS power received, the UE 110 can select three UEs at biased positions as shown in the system 300. In this case, a hyperbolic curve obtained using the trilateration can have a relatively high curvature. When the hyperbolic curve has the high curvature, the trilateration-aided positioning can be inaccurate.

Figure 4:
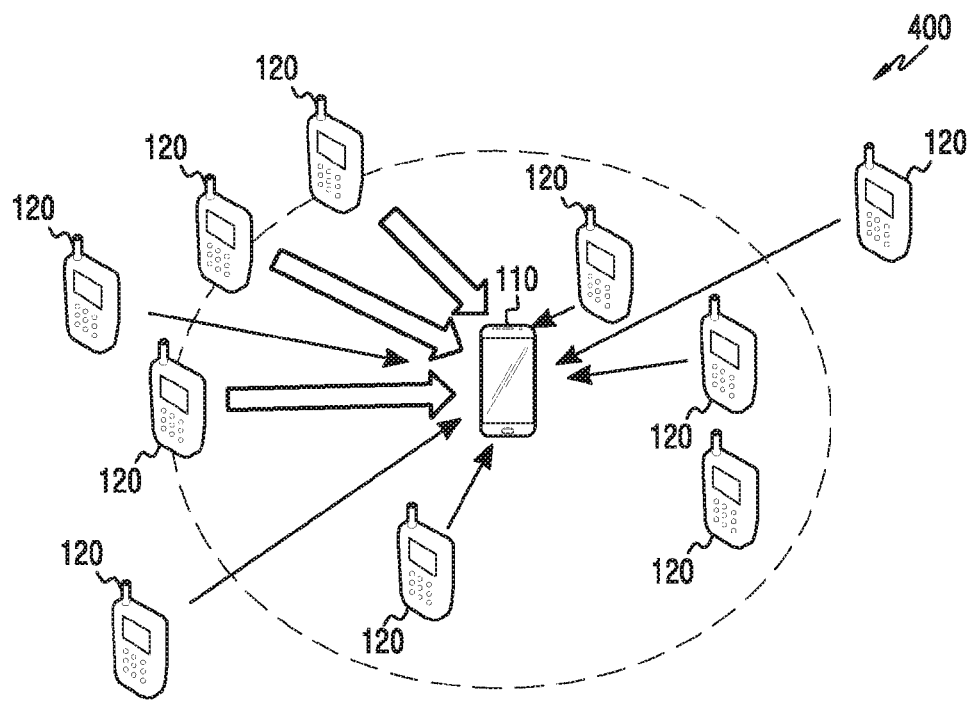
FIG. 4 is a diagram of an example of UE positioning by selecting neighboring UEs having a similar receive power according to an embodiment of the present disclosure.

FIG. 4 depicts an example of UE positioning by selecting neighboring UEs having a similar receive power according to an embodiment of the present disclosure.

Referring to FIG. 4, a system 400 can include a UE 110 and a UE 120. The UE 110 can require positioning. The UE 120 can assist in the positioning of the UE 110. The UE 120 can be a D2D UE. Considering power attenuation of a DMRS based on a distance, the UE 110 can select three UEs 120 having similar receive DMRS powers, as reference UEs. Since the UE is mobile, D2D UEs may not be uniformly distributed. The UE 110 can select three UEs of the similar DMRS receive power at biased positions in the system 400. In this case, a hyperbolic curve obtained using the trilateration can have a relatively high curvature. When the hyperbolic curve has the high curvature, the trilateration-aided positioning can be inaccurate.

An apparatus and an operating method of a UE according to various embodiments can enhance the positioning accuracy by using the positions between the UE and the D2D UEs, the TA values, the UE transmit power, and coordinate information.

Figure 5:
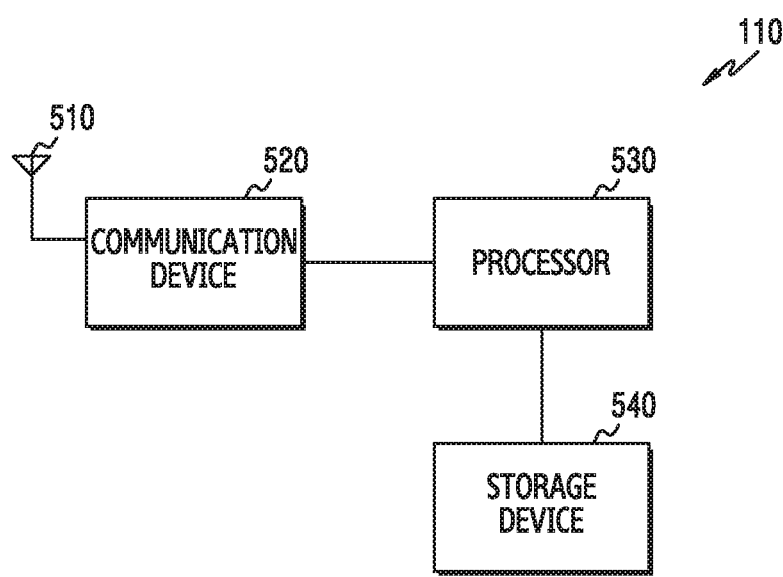
FIG. 5 is a block diagram of a UE according to an embodiment of the present disclosure.

FIG. 5 is a block diagram of a UE, which can be included in the UE 110 of FIG. 1, according to an embodiment of the present disclosure.

Referring to FIG. 5, the UE 110 can include an antenna 510, a communication device 520, a processor 530, and a storage device 540.

The antenna 510 can include one or more antennas. The antenna 510 can be configured for multiple input multiple output (MIMO).

The communication device 520 can transmit or receive a signal over a radio channel.

The communication device 520 can convert a baseband signal to a bit string and vice versa according to a physical layer standard of a system. For example, for data transmission, the communication device 520 can generate complex symbols by encoding and modulating a transmit bit stream. For example, when receiving data, the communication device 520 can restore a receive bit stream by demodulating and decoding a baseband signal.

The communication device 520 can up-convert the baseband signal to a radio frequency (RF) signal and transmit the RF signal through the antenna 510. The communication device 520 can down-convert an RF signal received over the antenna 510 to a baseband signal. For example, the communication device 520 can include a transmit filter, a receive filter, an amplifier, a mixer, an oscillator, a digital analog converter (DAC), and an analog digital converter (ADC). The communication device 520 may be referred to as a transmitter, a receiver, and/or a transceiver.

The communication device 520 can broadcast a request signal for the positioning to neighboring UEs. The request signal can be newly generated for the positioning. The request signal can be generated by adding a flag bit including a 1-bit data field for the request notification, to an existing communication signal. The existing communication signal can include a D2D communication signal.

The communication device 520 can receive from the neighboring UEs (e.g., the UE 120) response signals corresponding to the request signal. The response signal can be used to calculate a distance between the UE 110 and the UE 120.

The communication device 520 can broadcast a D2D discovery signal to the neighboring UEs for the positioning. The D2D discovery signal can be generated by adding UE transmit power information including a 7-bit data field and a designated value, to a positioning request signal. The designated value can adaptively change according to the distance between the UE 110 and the eNB.

The communication device 520 can receive response signals corresponding to the D2D discovery signal from the neighboring UEs (e.g., the UE 120). The response signal can be configured the same as the D2D discovery signal. The response signal can be used to calculate the distance between the UE 110 and the UE 120.

The communication device 520 can perform wide area communication with the eNB. Through the wide area communication, the communication device 520 can provide IDentifier (ID) information of the neighboring UEs to the eNB. Through the wide area communication, the communication device 520 can receive coordinate information of the neighboring UEs from the eNB.

The processor 530 can control the operations of the UE 110. For example, the processor 530 can transmit or receive a signal through the communication device 520. The processor 530 can record data in the storage device 540 and read the recorded data from the storage device 540. For doing so, the processor 530 may indicate a set of processors. For example, the processor 530 can include a communication processor (CP) for controlling the communication and an application processor (AP) for controlling a higher layer such as an application program.

The processor 530 can calculate the distance between the UE 110 and the UE 120 of FIG. 1. The processor 530 can group the UEs of the same calculated distance. The processor 530 can select a set of UEs based on the grouping. The processor 530 can select adequate UEs from the selected set UEs for the positioning of the UE 110. The processor 530 can generate position information of the UE 110 based on the distances between the selected UEs and the UE 110.

The storage device 540 can store a control command code for controlling the UE 110, control data, or user data. The storage device 540 can include at least one of a volatile memory and a nonvolatile memory. The nonvolatile memory can include a read only memory (ROM), programmable ROM (PROM), an electrically PROM (EPROM), an electrically erasable PROM (EEPROM), a flash memory, a phase-change random access memory (PRAM), a magnetic RAM (MRAM), a resistive RAM (RRAM), and a ferroelectric RAM (FRAM). The volatile memory can include at least one of a dynamic RAM (DRAM), a static RAM (SRAM), a synchronous DRAM (SDRAM), a PRAM, an MRAM, an RRAM, and a FeRAM.

The storage device 540 can include a nonvolatile medium such as a hard disk drive (HDD), a solid state disk (SSD), an embedded multimedia card (eMMC), and a universal flash storage (UFS).

Figure 6:
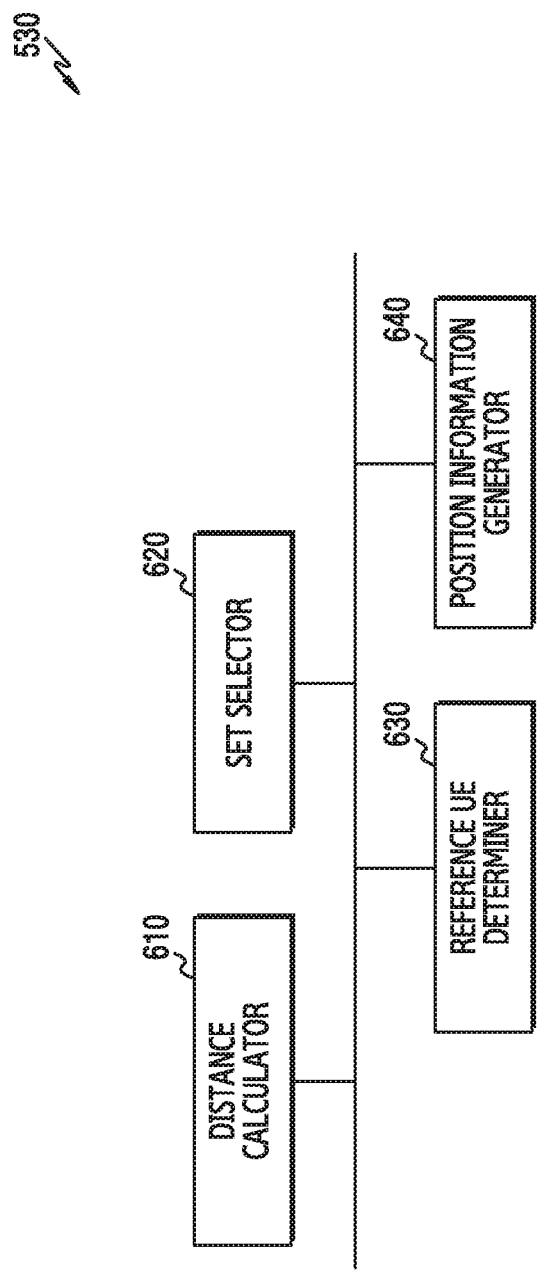
FIG. 6 is a block diagram of a processor according to an embodiment of the present disclosure.

FIG. 6 is a block diagram of a processor, which can be included in the processor 530 of FIG. 5, according to an embodiment of the present disclosure.

Referring to FIG. 6, the processor 530 can include a distance calculator 610, a set selector 620, a reference UE determiner 630, and a position information generator 640.

The distance calculator 610 can calculate a distance between the UE 110 and the UE 120 of FIG. 1.

The distance calculator 610 can calculate the distance between the UE 110 and the UE 120 based on a TA value. The distance calculator 610 can calculate the distance between the UE 110 and the UE 120 based on a response signal, a TA value of the UE 110, and a TA value of the UE 120.

The response signal can correspond to a request signal broadcast by the UE 110 for the positioning. When the request signal power received at the UE 120 exceeds a designated value, the response signal can be transmitted from the UE 120 to the UE 110. The designated value can be determined according to the TA value of the UE 120. The designated value can flexibly change according to the position of the UE 120.

It is assumed that the designated value is fixed. When the UE 110 is close to the eNB, the UE 110 can broadcast the request signal with relatively low transmit power in order to avoid interference. When the designated value is fixed, the UE 120 receiving the request signal can determine that the received request signal power is below the designated value and thus may not transmit a response signal regardless of the distance from the UE 110. When the UE 110 is away from the eNB, the UE 110 can broadcast the request signal with a relatively high transmit power. When the designated value is fixed, the UE 120 receiving the request signal can determine that the received request signal power exceeds the designated value and thus can transmit the response signal despite the long distance from the UE 110. The designated value can be flexibly determined according to the TA value indicating the distance between the UE 120 and the eNB.

The TA value of the UE 120 can be obtained through the synchronization between the UE 110 and the UE 120.

The TA value of the UE 110 can be obtained as follows.

When the UE 110 is radio resource control (RRC)-connected, the UE 110, which already communicates with the eNB, can know its TA value. When the UE 110 is RRC-idle, the UE 110 can request the TA value from the eNB. When the UE 110 is RRC-idle, the UE 110 can use a TA value of a D2D signal of neighboring UEs received at a highest reference signal received power (RSRP), where the RSRP is an average power received from a single reference signal resource element. When the UE 110 is RRC-idle, the UE 110 can use the TA value of the D2D signal received at the high RSRP.

For example, the distance calculator 610 can calculate the distance between the UE 110 and the UE 120 based on Equation 2.

$$(T-d_1+d_x)+(T-d_2)=(d_2-d_1+d_x)=A \qquad \text{Equation 2}$$

T can denote a time of the eNB. $d_1$ can denote the TA value of the UE 120. $d_x$ can denote a value corresponding to the distance between the UE 110 and the UE 120. $d_x$ can be unknown. $d_2$ can denote the TA value of the UE 110. A can denote a received time offset of the response signal. Since $d_1$, $d_2$, and A are known, the distance calculator 610 can obtain $d_x$ based on Equation 2. Based on $d_x$, the distance calculator 610 can calculate the distance between the UE 110 and the UE 120.

The distance calculator 610 can calculate the distance between the UE 110 and the UE 120 based on a path loss value between the UE 110 and the UE 110. The distance calculator 610 can calculate the distance between the UE 110 and the UE 120 based on a transmit power and an RSRP of the response signal.

The UE 110 can broadcast a D2D discovery signal for the positioning. The D2D discovery signal can include the transmit power of the UE 110. The UE 120 receiving the D2D discovery signal can calculate the path loss value from the RSRP of the D2D discovery signal and the transmit power of the UE 110. The D2D discovery signal can include a designated value which flexibly changes according to the positions of the UE 110 and the eNB. The designated value can be used as a reference of the path loss value. The designated value can be determined based on the distance between the UE 110 and the eNB. The UE 120 can estimate the distance between the UE 110 and the UE 120 based on a difference of the RSRP of the D2D discovery signal and the transmit power of the UE 110. The UE 120 can determine whether to send a response signal by comparing the estimated distance with the designated value. When the estimated distance is smaller than the designated value, the UE 120 can transmit a response signal corresponding to the D2D discovery signal to the UE 110. The response signal can include transmit power information of the response signal. When the estimated distance is greater than or equal to the designated value, the UE 120 may not transmit a response signal corresponding to the D2D discovery signal to the UE 110.

The distance calculator 610 can calculate the path loss value between the UE 110 and the UE 120 based on the RSRP of the response signal and the transmit power information of the response signal. The path loss value can correspond to the distance between the UE 110 and the UE 120. The distance calculator 610 can calculate the distance between the UE 110 and the UE 120 based on the path loss value.

The set selector 620 can group the UEs 120. The set selector 620 can group UEs at the same distance (or a similar distance within a certain error) from the UE 110, into one set. For example, the set selector 620 can group some of the UEs 120 into a set of UEs having a distance A between the UE 110 and the UE 120, a set of UEs having a distance B between the UE 110 and the UE 120, and a set of UEs having a distance C between the UE 110 and the UE 120.

The set selector 620 can select one of the grouped sets. For example, the set selector 620 can select, as a set for selecting a reference UE, the set including the greatest number of the UEs from the grouped sets. For example, the set selector 620 can select, as the set for selecting the reference UE, the set including the UEs estimated to be uniformly distributed around the UE 110, from the grouped sets. When the UE 110 can perform receive beamforming, the UE 110 may estimate the uniform distribution of the UE 120.

The reference UE determiner 630 can select, as the reference UEs, three UEs from the selected set based on the TA values of the UEs 120. The reference UE determiner 630 can select three UEs from the selected set based on the TA values of the UEs 120 such that a triangular area including the three UEs as vertices covers the UE 110. When the UE 110 is covered by the triangular area, the three selected UEs are uniformly placed around the UE 110. For example, the reference UE determiner 630 can select, as the reference UEs, a UE having the greatest TA value, a UE having the smallest TA value, and a UE having the TA value between the greatest TA value and the smallest TA value from the UEs of the selected set such that the triangular area covers the UE 110. For example, the reference UE determiner 630 can select, as the reference UEs, a UE having the greatest transmit power of the response signal, a UE having the smallest transmit power of the response signal, and a UE having the transmit power between the greatest transmit power and the smallest transmit power from the UEs of the selected set such that the triangular area covers the UE 110.

The reference UE determiner 630 can select three of the UEs 120 as the reference UEs based on coordinate information of the UEs 120 received from the eNB. The UE 110 can transmit ID information of the UEs 120 to the eNB. The ID information can be acquired through the D2D communication or the D2D discovery between the UE 110 and the UE 120. The ID information may be obtained from broadcasting information of the UE 120. For example, the UE 120 can broadcast its ID over a physical sidelink broadcast channel (PSBCH). The eNB can generate the coordinate information of the UEs 120 based on the ID information. The eNB can transmit the generated coordinate information to the UE 110. The reference UE determiner 630 can select three UEs uniformly distributed around the UE 110 as the reference UEs based on the coordinate information.

The position information generator 640 can generate position information of the UE 110 based on a distance between the UE 110 and the reference UE. For example, the position information generator 640 can measure the position of the UE 110 using the trilateration. Based on the measured position, the position information generator 640 can generate the position information of the UE 110.

Figure 7:
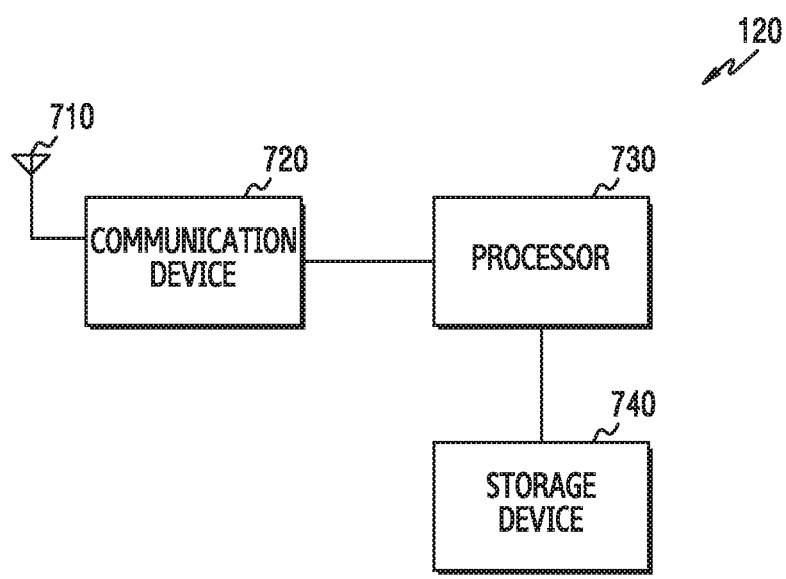
FIG. 7 is a block diagram of another UE according to an embodiment of the present disclosure.

FIG. 7 is a block diagram of another UE, which can be included in the UE 120 of FIG. 1, according to an embodiment of the present disclosure.

Referring to FIG. 7, the UE 120 can include an antenna 710, a communication device 720, a processor 730, and a storage device 740.

The antenna 710 can include one or more antennas. The antenna 710 can be configured for MIMO.

The communication device 720 can convert a baseband signal to a bit string and vice versa according to a physical layer standard of a system. For example, for data transmission, the communication device 720 can generate complex symbols by encoding and modulating a transmit bit stream. For example, when receiving data, the communication device 720 can restore a receive bit stream by demodulating and decoding a baseband signal.

The communication device 720 can up-convert the baseband signal to an RF signal and transmit the RF signal through the antenna 710. The communication device 720 can down-convert an RF signal received over the antenna 710 to a baseband signal. For example, the communication device 720 can include a transmit filter, a receive filter, an amplifier, a mixer, an oscillator, a DAC, and an ADC. The communication device 720 may be referred to as a transmitter, a receiver, and/or a transceiver.

The communication device 720 can receive a request signal from the UE 110 of FIG. 1. The request signal is to measure the position of the UE 110. The request signal can be a D2D communication signal.

The communication device 720 can transmit a response signal to the UE 110. The response signal can be used to calculate the distance between the UE 110 and the UE 120.

The communication device 720 can receive a D2D discovery signal from the UE 110. The D2D discovery signal is to measure the position of the UE 110. The D2D discovery signal can include a transmit power of the UE 110 and a designated value. The designated value can adaptively change according to the distance between the UE 110 and the eNB. The designated value can be used by the communication device 720 to determine whether to transmit a response signal corresponding to the D2D discovery signal to the UE 110.

The communication device 720 can transmit the response signal corresponding to the D2D discovery signal to the UE 110. The response signal can have the same structure as the D2D discovery signal. For example, the response signal can include its transmit power. The response signal can be used to calculate the distance between the UE 110 and the UE 120.

The processor 730 can control the operations of the UE 120. For example, the processor 730 can transmit or receive a signal through the communication device 720. The processor 730 can record data in the storage device 740 and read the recorded data from the storage device 740. For doing so, the processor 730 may indicate a set of processors. For example, the processor 730 can include a CP for controlling the communication and an AP for controlling a higher layer such as an application program.

The processor 730 can determine whether to transmit the response signal.

When the UE 120 receives a request signal for the positioning of the UE 110, the processor 7830 can determine whether to send a response signal by comparing a designated value with a receive power of the request signal. The designated value can be determined according to a TA value of the UE 120. The designated value can flexibly change according to a position of the UE 120. When the receive power of the request signal is greater than the designated value, the processor 730 can determine to transmit the response signal to the UE 110. When the receive power of the request signal is smaller than or equal to the designated value, the processor 730 can determine not to transmit the response signal to the UE 110.

When the UE 120 receives a D2D discovery signal for the positioning of the UE 110, the processor 730 can determine whether to transmit the response signal, based on the designated value, the transmit power of the D2D discovery signal, and an RSRP of the D2D discovery signal. The designated value can flexibly change according to the distance of the UE 110 and the eNB. The processor 730 can calculate a path loss value between the UE 110 and the UE 120 using a difference of the transmit power of the D2D discovery signal and the RSRP of the D2D discovery signal. The processor 730 can estimate the distance between the UE 110 and the UE 120 based on the calculated path loss value. When the estimated distance is smaller than the designated value, the processor 730 can determine to transmit the response signal. When the estimated distance is greater than or equal to the designated value, the processor 730 can determine not to transmit the response signal.

The storage device 740 can store a control command code for controlling the UE 120, control data, or user data. The storage device 740 can include at least one of a volatile memory and a nonvolatile memory. The nonvolatile memory can include a ROM, PROM, an EPROM, an EEPROM, a flash memory, a PRAM, a MRAM, a RRAM, and a FRAM. The volatile memory can include at least one of a DRAM, a SRAM, a SDRAM, a PRAM, an MRAM, an RRAM, and a FeRAM.

The storage device 740 can include a nonvolatile medium such as a HDD, a SSD, an eMMC, and a UFS.

Figure 8:
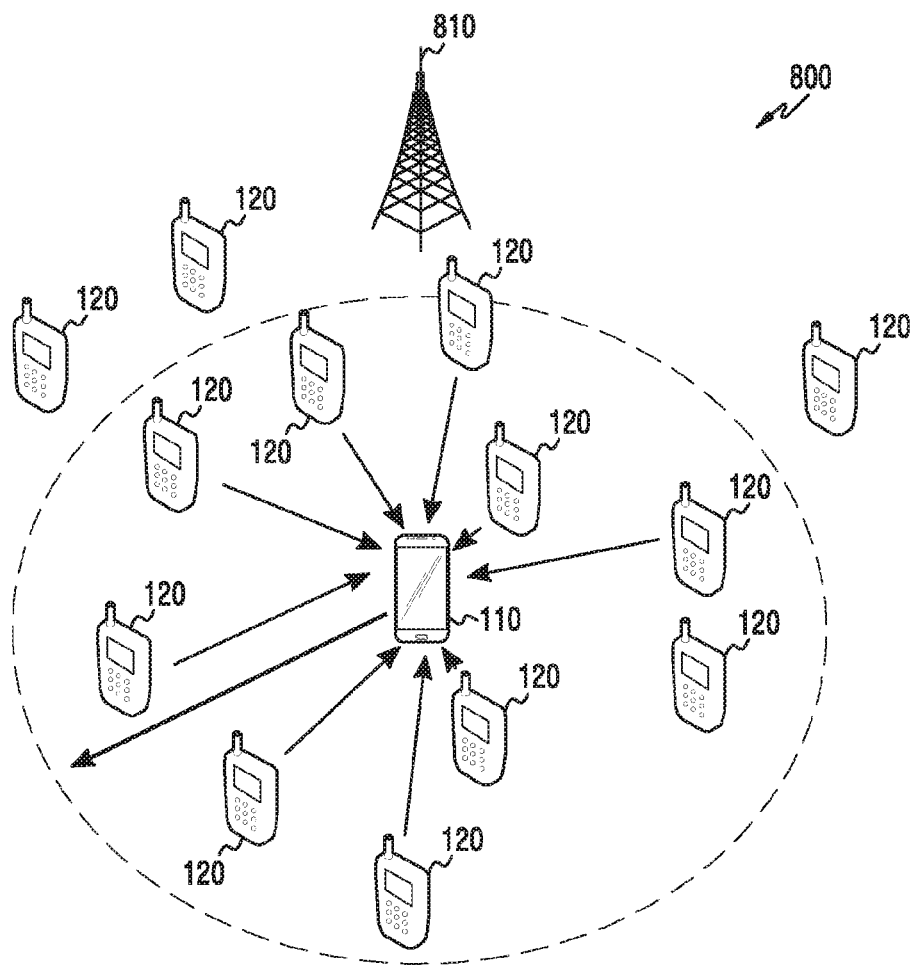
FIG. 8 is a diagram of an example of signal transmission or reception for UE positioning according to an embodiment of the present disclosure.

FIG. 8 depicts an example of signal transmission or reception for UE positioning according to an embodiment of the present disclosure.

Referring to FIG. 8, a system 800 can include the UE 110 and the UE 120 of FIG. 1, and an eNB 810. The UE 110 can require positioning. The UE 120 can assist in the positioning of the UE 110. The eNB 810 can communicate with the UE 110 or the UE 120. The eNB 810 can communicate with the UE 110 or the UE 120 using various modulation methods or various communication methods. While the single eNB 810 is depicted in FIG. 8, it may include a plurality of eNBs. For example, the eNB 810 can include a first eNB for serving the UE 110 and a second eNB for serving the UE 120.

The UE 110 can recognize its TA value by communicating with the eNB 810. The UE 120 can recognize its TA value by communicating with the eNB 810. When the UE 110 is RRC-idle, the UE 110 can request its TA value from the eNB 810. When the UE 110 is RRC-idle, the UE 110 can estimate the TA value from neighboring UEs such as UE 120. When the UE 120 is RRC-idle, the UE 120 can request its TA value from the eNB 810. When the UE 120 is RRC-idle, the UE 120 can estimate the TA value from neighboring UEs such as UE 120. The UE 110 and the UE 120 can recognize the mutual TA value. For example, the UE 110 and the UE 120 can recognize the mutual TA value through a sidelink synchronization signal or a PSBCH.

The UE 110 can broadcast a request signal for positioning the UE 110. The request signal can be a D2D communication signal. When the UE 110 is close to the eNB 810, the UE 110 can lower a transmit power of the request signal to reduce interference. When the UE 110 is far from the eNB 810, the UE 110 can increase the transmit power of the request signal.

The UE 120 can receive the request signal. The UE 120 can compare the request signal with a designated value and thus transmit a response signal corresponding to the request signal. The designated value can be determined according to a TA value of the UE 120. The designated value can flexibly change according to a position of the UE 120. For example, when the receive power of the request signal is greater than the designated value, the UE 120 can determine to transmit the response signal to the UE 110. For example, when the receive power of the request signal is smaller than the designated value, the UE 120 may not transmit the response signal to the UE 110.

The UE 110 can broadcast a D2D discovery signal for the positioning. The D2D discovery signal can include a transmit power of the UE 110 and a designated value. The designated value can be used for the UE 120 to determine whether to transmit a response signal corresponding to the D2D discovery signal. The designated value can be determined based on a distance between the UE 110 and the eNB 810.

The UE 120 can receive the D2D discovery signal. The UE 120 can calculate a path loss value by subtracting an RSRP of the D2D discovery signal from the transmit power of the D2D discovery signal. Based on the path loss value, the UE 120 can estimate a distance between the UE 110 and the UE 120. Based on the designated value and the distance between the UE 110 and the UE 120, the UE 120 can determine whether to send the response signal. For example, when the estimated distance is smaller than the designated value, the UE 120 can transmit the response signal to the UE 110. For example, when the estimated distance is greater than or equal to the designated value, the UE 120 may not transmit the response signal to the UE 110.

Referring to FIG. 8, the UE 110 can determine the UEs sending the response signal among its neighboring UEs, as a first candidate group for its positioning. Next, the UE 110 can select a reference UE for the positioning from the UEs of the first candidate group.

An apparatus of a UE according to various embodiments can include a transceiver and a processor operatively coupled with the transceiver. The processor can broadcast a request signal for positioning the UE, receive response signals corresponding to the request signal from a plurality of UEs, based on received signal timings of the response signals and TA values of the UEs, selects one of UE sets which are classified based on a distance from the UE, select three UEs from the selected set based on the TA values such that a triangular area comprising the three UEs as vertices covers the UE, and generate position information of the UE based on distances between the three UEs and the UE. The processor can calculate the distances between the UEs and the UE based on the received signal timings, the TA values, and a TA value of the UE, classify the UEs into the sets based on the calculated distances, and select the one set comprising the greatest number of UEs from the sets. The processor can calculate the distances between the UEs and the UE by adding the TA values of the UEs to the received signal timings of the response signals and subtracting the TA value of the UE.

The processor can select a UE having the greatest TA value, a UE having the smallest TA value, and a UE having the TA value between the greatest TA value and the smallest TA value from the UEs of the selected set such that the triangular area covers the UE.

The response signal can be transmitted from each of the UEs when a receive power of the request signal received at the UEs is greater than a designated value. The designated value can be determined based on the TA value of the UEs.

The processor can obtain the TA values of the UEs from the UEs using D2D signals.

When the UE is RRC-idle, the processor can request a TA value from an eNB which serves the UE, and receives the TA value from the eNB.

When the UE is RRC-idle, the processor can determine, as a TA value of the UE, a TA value of a signal having the highest RSRP among received D2D signals.

An apparatus of a UE can include a transceiver and a processor operatively coupled with the transceiver. The processor can broadcast a D2D discovery signal for positioning the UE, receive response signals corresponding to the D2D discovery signal from a plurality of UEs, based on a RSRP of the response signal and a receive power of the response signal, select one of UE sets which are classified based on a distance from the UE, select three UEs from the selected set based on the transmit power of the response signal such that a triangular area comprising the three UEs as vertices covers the UE, and generate position information of the UE based on distances between the three UEs and the UE.

Figure 9:
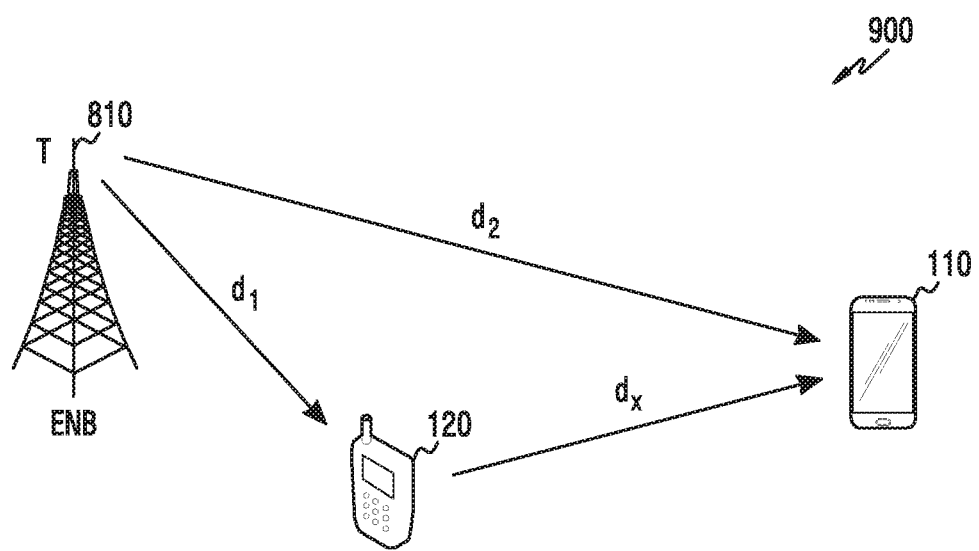
FIG. 9 is a diagram of an example of distance calculation between UEs according to an embodiment of the present disclosure.

FIG. 9 depicts an example of distance calculation between UEs according to an embodiment of the present disclosure.

Referring to FIG. 9, a system 900 can include the UE 110, the UE 120, and the eNB 810.

The UE 110 can calculate a distance between the UE 110 and the UE 120 based on a TOA of a response signal of the UE 120, TA information of the UE 110, and TA information of the UE 120. The UE 110 can calculate the distance between the UE 110 and the UE 120 based on Equation 2.

The UE 110 can calculate the distance between the UE 110 and the UE 120 based on a path loss value between the UE 110 and the UE 120. The UE 110 can calculate the distance between the UE 110 and the UE 120 based on a transmit power and an RSRP of the response signal.

Figure 10:
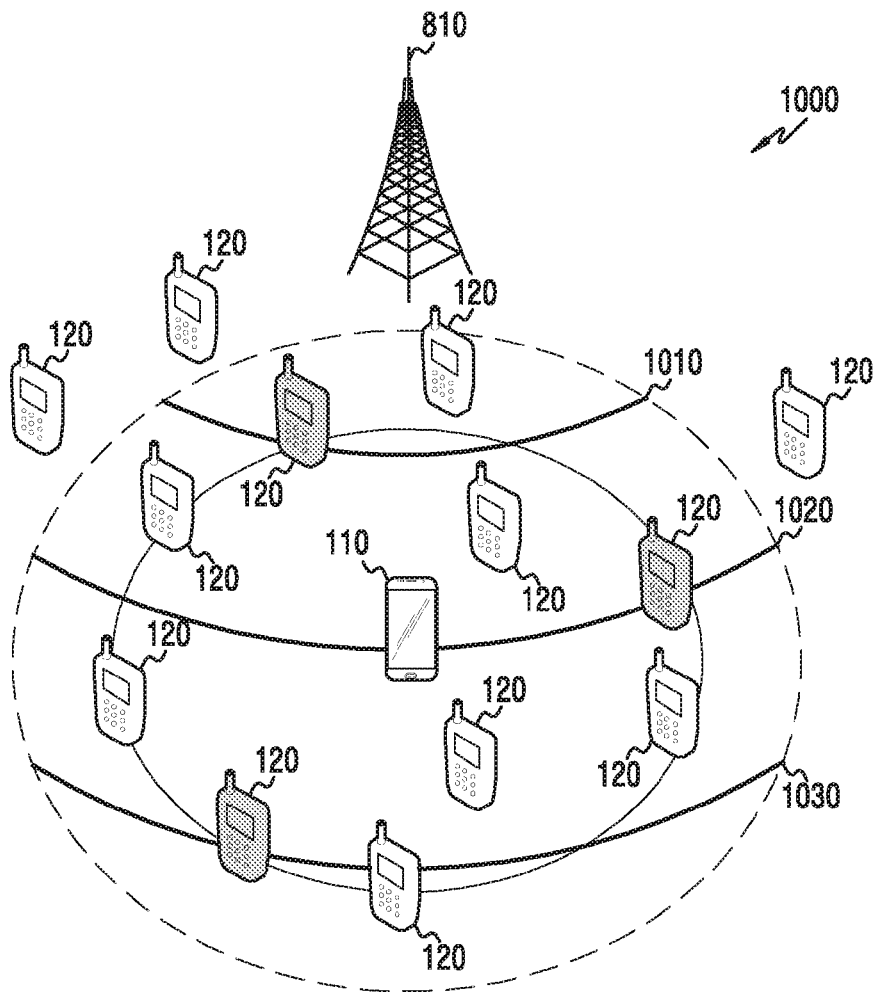
FIG. 10 is a diagram of an example of reference UE selection according to an embodiment of the present disclosure.

FIG. 10 depicts an example of reference UE selection according to an embodiment of the present disclosure.

Referring to FIG. 10, a system 1000 can include the UE 110, the UE 120, and the eNB 810.

The UE 110 can group the UE 120 at the same (or similar) distance from the UE 110. The 110 can group UEs of the same distance (or a similar distance within a certain range) into one set.

The UE 110 can select one of sets. For example, the UE 110 can select a set including the greatest number of the UEs 120 among the sets. For example, the UE 110 can select a set including UEs estimated to uniformly distribute around the UE 110.

The UE 110 can select three UEs from the selected set based on the TA values of the UEs 120. The UE 110 can select three UEs uniformly distributed around the UE 110 as reference UEs. For example, the UE 110 can select three UEs from the selected set such that a triangular area including the three UEs as vertices covers the UE 110. For example, using the TA information of the UE 120, the UE 110 can specify a line 1010 indicating UEs closest to the eNB 810, a line 1020 indicating UEs at an intermediate distance from the eNB 810, and a line 1030 indicating UEs farthest from the eNB 810. Using the lines 1010, 1020, and 1030, the UE 110 can select three UEs from the selected set as the reference UEs such that the triangular area covers the UE 110. Using the TA information of the UE 120, the UE 110 can select, as the reference UEs, a UE having the greatest TA value, a UE having the smallest TA value, and a UE having a TA value between the greatest TA value and the smallest TA value from the selected set.

The UE can generate its position information based on distances between the three selected UEs and the UE 110. The UE 110 may generate its position information by sending the reference UE information to the eNB 810 or a location server.

As shown in FIGS. 8, 9 and 10, the UE 110 can measure its position without errors.

Figure 11:
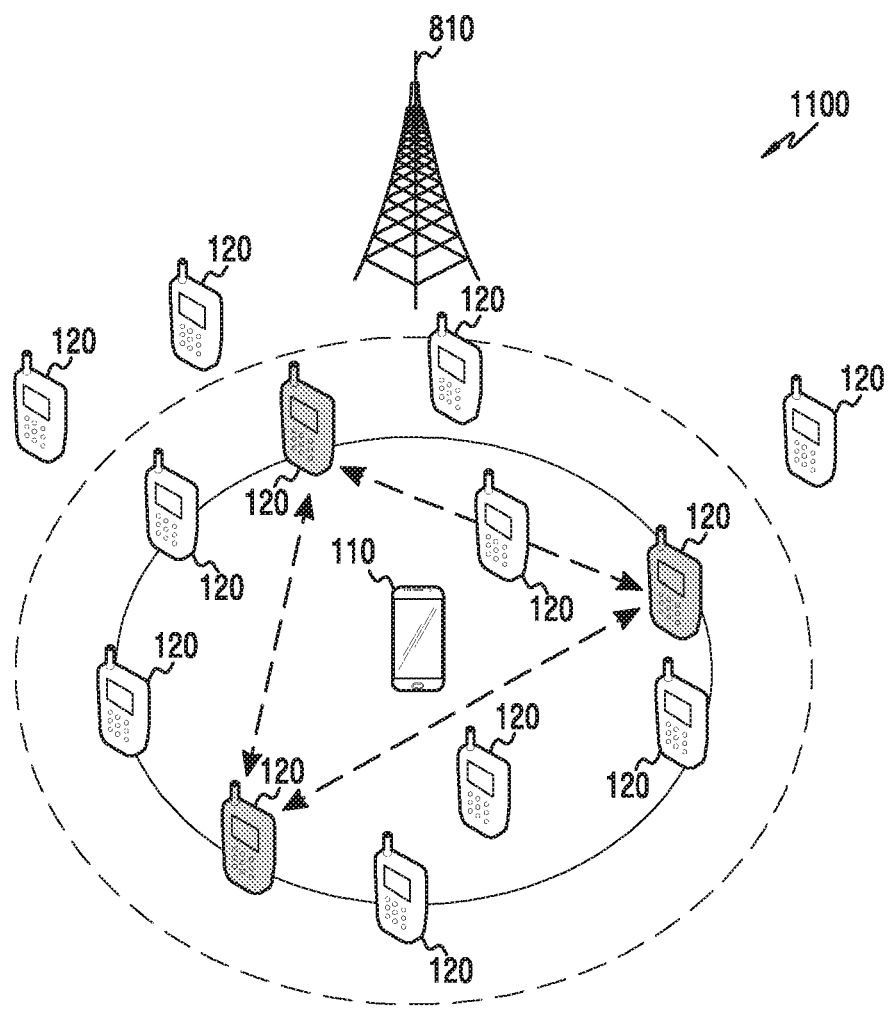
FIG. 11 is a diagram of another example of reference UE selection according to an embodiment of the present disclosure.

FIG. 11 depicts another example of reference UE selection according to an embodiment of the present disclosure.

Referring to FIG. 11, a system 1100 can include the UE 110, the UE 120, and the eNB 810.

The UE 110 can transmit or receive mutual distance information using a D2D communication signal. The UEs 120 can obtain the mutual distance information as shown in FIGS. 8 and 9.

Based on the distance information between the UEs 120 and the UE 110 and distance information between the UEs 120, the UE 110 can select three UEs uniformly distributed around the UE 110.

According to an embodiment, the UE 110 can broadcast a signal requesting UE information of the same distance to the UEs 120. The signal can be a D2D communication signal. The UEs 120 can receive the signal. The UEs 120 can provide the UE information of the same distance to the UE 110.

The UE 110 can measure its position using the distances between the selected or provided three UEs and the UE 110. The UE 110 can generate its position information based on the measurement.

Figure 12:
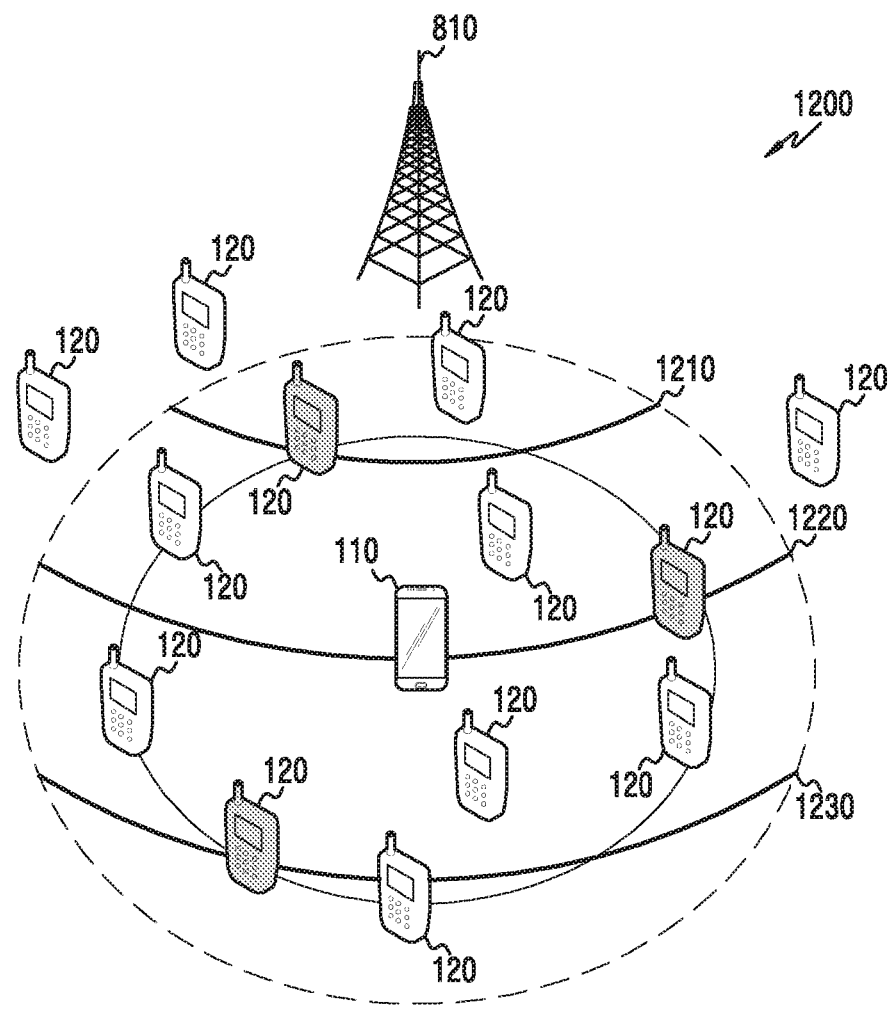
FIG. 12 is a diagram of yet another example of reference UE selection according to an embodiment of the present disclosure.

FIG. 12 depicts yet another example of reference UE selection according to an embodiment of the present disclosure.

Referring to FIG. 12, a system 1200 can include the UE 110, the UE 120, and the eNB 810.

The UE 110 can request to assist in the positioning using a D2D discovery signal. In response to the D2D discovery signal, the UE 120 can transmit a response signal to the UE 110. The UE 110 can estimate a distance between the UE 120 and the eNB 810 based on a transmit power of the response signal of the UE 120. Hence, the UE 110 can set a line 1210 specifying UEs close to the eNB 810, a line 1220 specifying UEs at an intermediate distance from the eNB 810, and a line 1230 specifying UEs far from the eNB 810. The UE 110 can select the UE on the line 1210, the UE on the line 1220, and the UE on the line 1230 as reference UEs.

The UE 110 can measure its position based on distances between the reference UEs and the UE 110. The UE 110 can generate its position information using the measurement. According to an embodiment, the UE 110 may transmit the measurement result to a location server.

Figure 13:
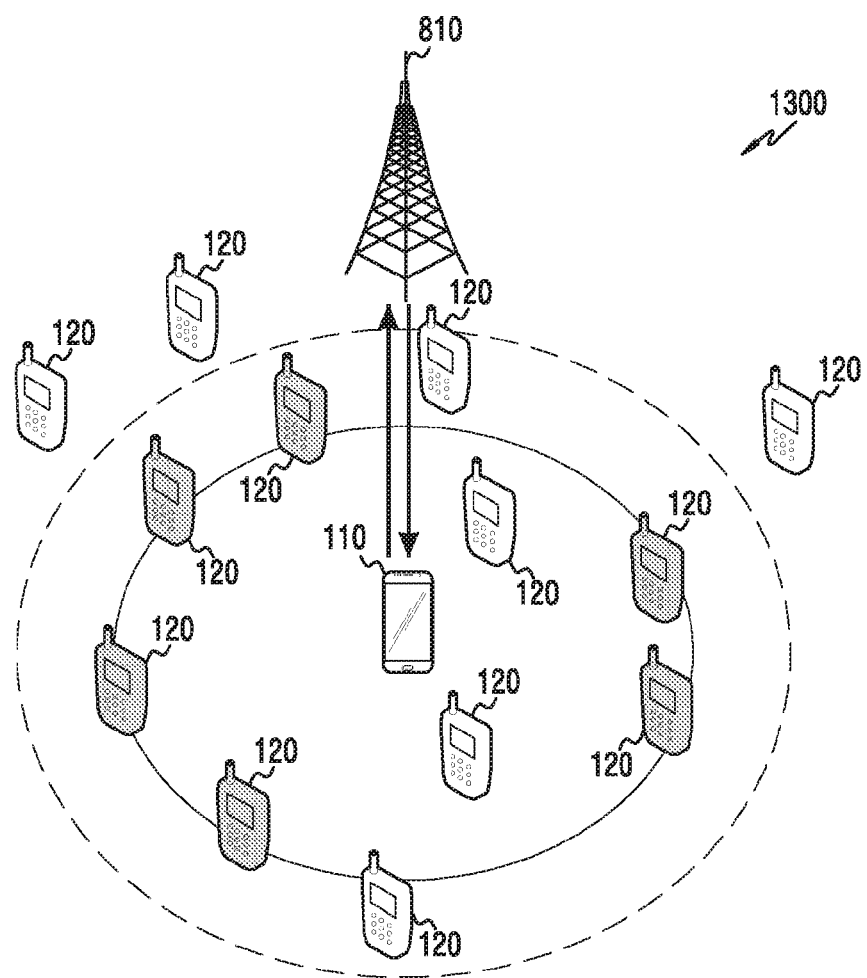
FIG. 13 is a diagram of still another example of reference UE selection according to an embodiment of the present disclosure.

FIG. 13 depicts still another example of reference UE selection according to an embodiment of the present disclosure.

Referring to FIG. 13, a system 1300 can include the UE 110, the UE 120, and the eNB 810 of FIG. 1.

The UE 110 can obtain an ID of the UE 120 through D2D communication or D2D discovery with the UE 120. The UE 110 can obtain the ID of the UE 120 as shown in FIG. 8. For example, the UE 120 can transmit to the UE 110 a response signal, including its ID, corresponding to a positioning request signal or a D2D discovery signal. The UE 110 can receive the response signal and thus obtain the ID of the UE 120.

The UE 110 can select a set including the reference UEs as shown in FIG. 9 and/or FIG. 10.

The UE 110 can transmit the ID of the UE 120 belonging to the selected set to the eNB 810. The eNB 810 can receive the ID of the UE 120. According to an embodiment, the UE 110 can transmit IDs of the UEs 120 obtained from the response signals, to the eNB 810 by omitting the set selection.

The eNB 810 can receive the ID of the UE 120 from the UE 110. The eNB 810 can generate coordinate information of the UE 120 based on the ID of the UE 120. The eNB 810 can transmit the coordinate information of the UE 120 to the UE 110.

The UE 110 can receive the coordinate information of the UE 120 from the eNB 810. The UE 110 can select a reference UE based on the coordinate information of the UE 120. For example, based on the coordinate information, the UE 110 can select three UEs uniformly distributed around the UE 110, as the reference UEs.

According to various embodiments, the UE 110 can select some of UEs distributed around the UE 110, as the reference UEs. The UE 110 can select the reference UEs such that the selected UEs are uniformly distributed around the UE 110. Thus, the UE 110 can measure its accurate position. Based on the measurement, the UE 110 can generate its position information.

Figure 14:
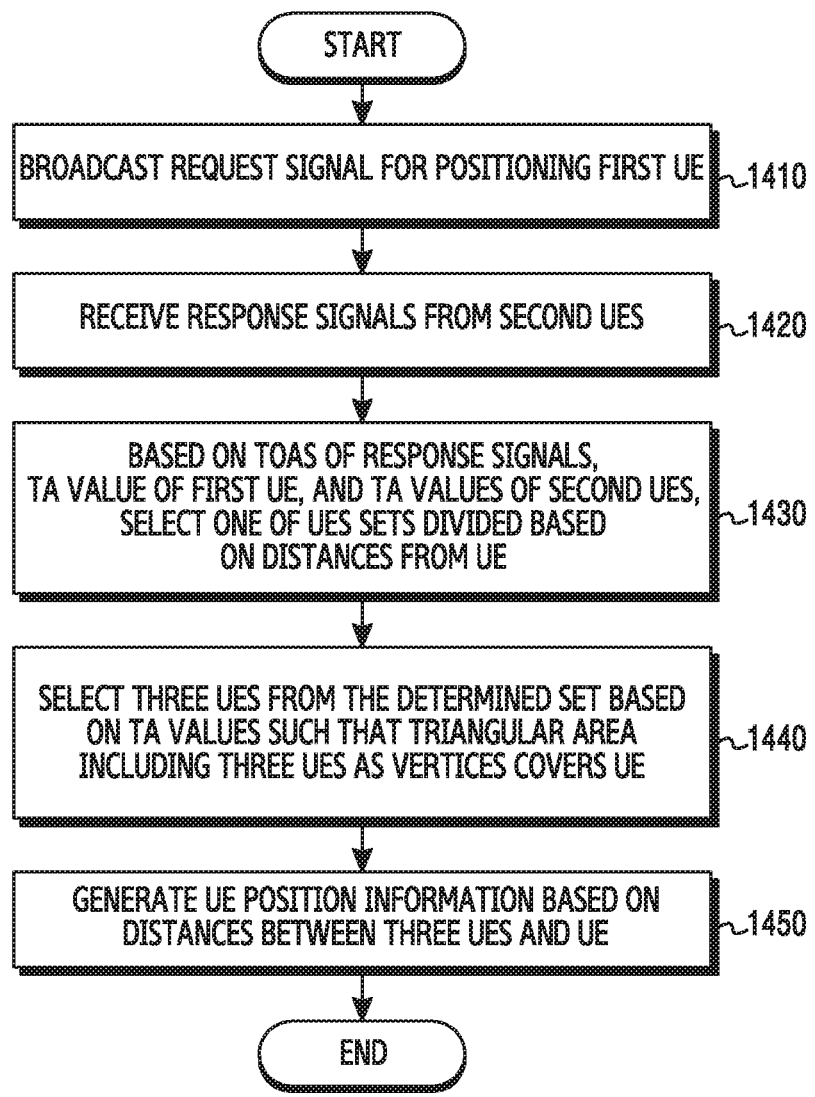
FIG. 14 is a flowchart of a UE operation method according to an embodiment of the present disclosure.

FIG. 14 is a flowchart of UE operations, which can be fulfilled by the UE 110 of FIG. 1 according to an embodiment of the present disclosure.

Referring to FIG. 14, in operation 1410, the UE 110 can broadcast a request signal for positioning of the UE 110. The UE 110 may be referred to as a first UE 110. The first UE 110 can broadcast the request signal with a different transmit power according to a distance from the eNB 810. For example, when the first UE 110 is close to the eNB, the first UE 110 can broadcast the request signal with a relatively low transmit power. For example, when the first UE 110 is far from the eNB, the first UE 110 can broadcast the request signal with a relatively high transmit power.

In operation 1420, the first UE 110 can receive response signals corresponding to the request signal from the UEs 120. The UE 120 may be referred to as a second UE 120. The second UE 120 can receive the request signal from the first UE 110. The second UE 120 can transmit a response signal corresponding to the request signal to the first UE 110. The response signal can be used to measure a distance between the first UE 110 and the second UE 120.

In operation 1430, based on a TOA of the response signal and a TA value, the first UE 110 can select one of sets including the second UEs 120 positioned at the same distance from the first UE 110. For example, the first UE 110 can generate a plurality of sets by grouping the second UEs 120 positioned at the same distance. The first UE 110 can select one of the sets as a set for selecting a reference UE.

In operation 1440, based on the TA values, the first UE 110 can select three UEs from the selected set such that a triangular area including the three second UEs 120 as vertices covers the first UE 110. To select UEs (e.g., the second UE 120) uniformly distributed around the first UE 110 as the reference UEs, the first UE 110 can select three UEs from the selected set based on the TA values such that the triangular area including the three second UEs 120 as the vertices covers the first UE 110.

In operation 1450, the first UE 110 can generate its position information based on the distances of the three UEs and the first UE 110. The first UE 110 can measure its position based on the distances of the three UEs and the first UE 110 using trilateration. Based on the measured position of the first UE 110, the first UE 110 can generate its position information.

According to various embodiments, the first UE 110 can select three UEs uniformly distributed from the neighboring UEs and thus measure its position. As shown in FIG. 14, the first UE 110 can measure its position with little error. The first UE 110 can generate its position information based on the measured position. The position information can be used to correct inaccuracy of a global positioning system (GPS). The position information may be used for the D2D communication or the D2D discovery. The position information may be used for public safety. The position information may be used for advertisement such as beacon.

Figure 15:
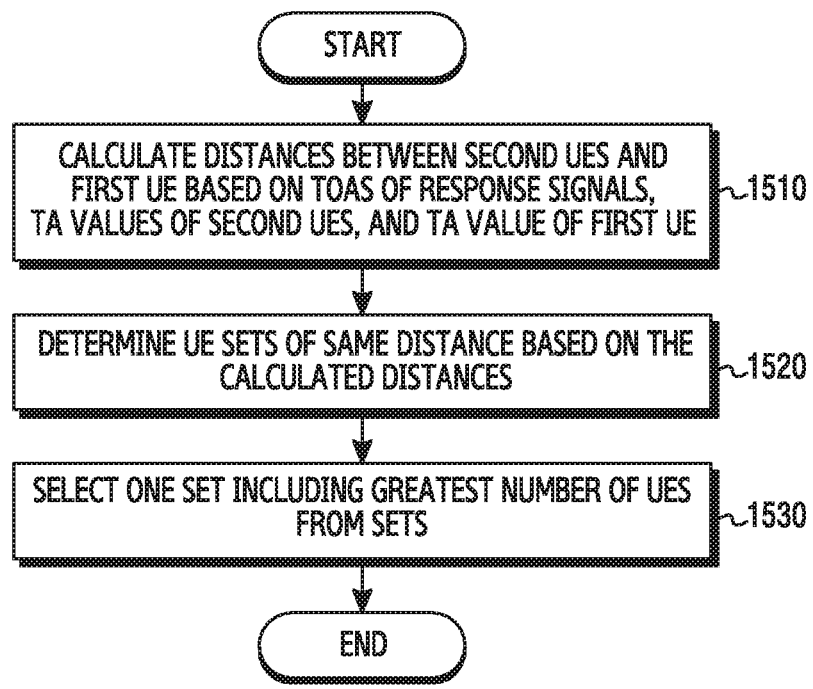
FIG. 15 is a flowchart of UE operations for selecting a set of UEs to select a reference UE according to an embodiment of the present disclosure.

FIG. 15 is a flowchart of UE operations for selecting a set of UEs for reference UE selection, which can be fulfilled by the UE 110 (or the first UE 110) of FIG. 1, according to an embodiment of the present disclosure.

Referring to FIG. 15, in operation 1510, the first UE 110 can calculate distances between the second UEs 120 and the first UE 110 based on a TOA of a response signal, TA values of the second UEs 120, and a TA value of the first UE 110. The first UE 110 can obtain an offset of the response signals from the TOAs of the response signals. With the TA values of the second UEs 120, the first UE 110 can calculate distances between the second UEs 120 and the eNB 810. The first UE 110 can calculate a distance between the first UE 110 and the eNB 810 based on the TA value of the first UE 110. The first UE 110 can calculate the distance between the first UE 110 and the second UE 120 using the calculated distances and the response signal offset. For example, the first UE 110 can calculate the distance between the first UE 110 and the second UE 120 based on Equation 2.

In operation 1520, the first UE 110 can determine sets of UEs having the same distance based on the calculated distances of the first UE 110 and the second UEs 120. For example, the first UE 110 can group the second UEs 120 based on the calculated distances and generate a plurality of sets.

In operation 1530, the first UE 110 can select one set including the greatest number of UEs from the sets. To obtain maximum neighboring UEs uniformly distributed, the first UE 110 can select the one set including the greatest number of UEs as a set for reference UE selection. The operation 1530 may be replaced by other operation. For example, when the first UE 110 can specify the second UEs 120 uniformly distributed, the first UE 110 can select a set including the uniformly distributed UEs as the reference UE selection set.

According to various embodiments, the first UE 110 can select the reference UE without increasing complexity as shown in FIG. 15. The first UE 110 can measure its position with little error as shown in FIG. 15.

Figure 16:
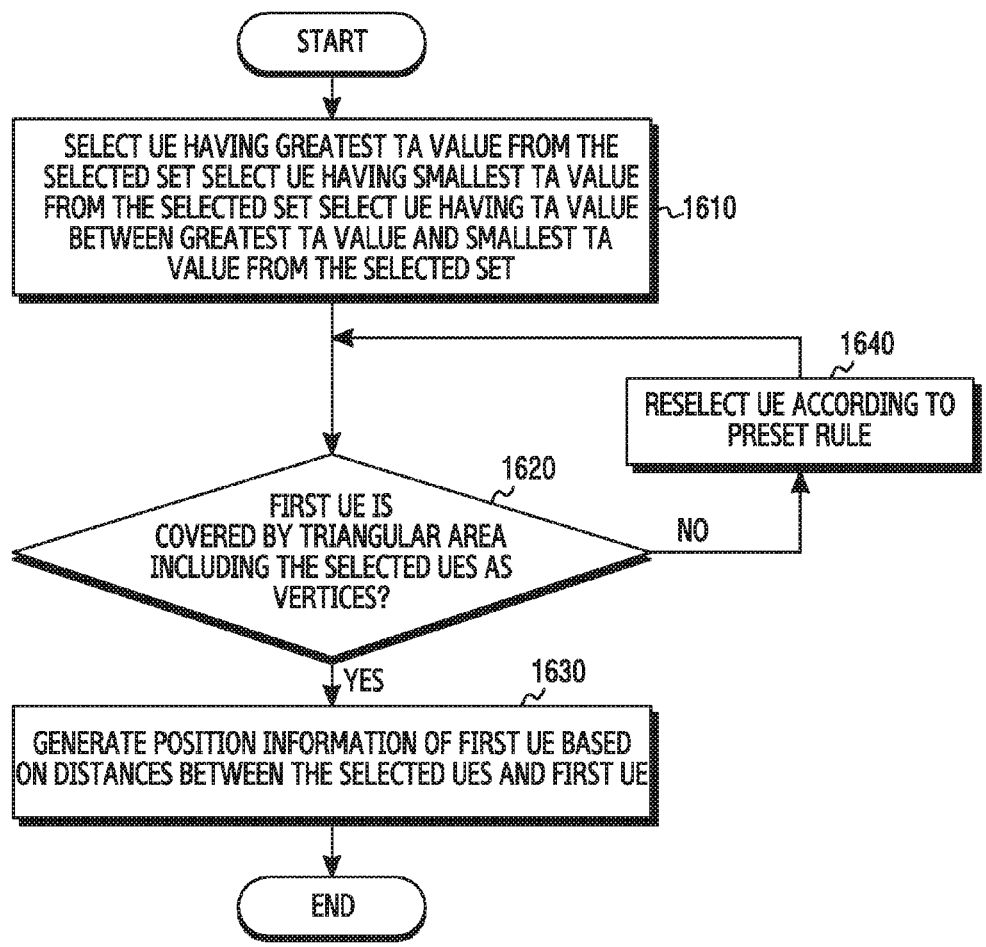
FIG. 16 is a flowchart of a UE operation method for generating UE position information according to an embodiment of the present disclosure.

FIG. 16 is a flowchart of UE operations for generating UE position information according to an embodiment of the present disclosure, which can be fulfilled by the first UE 110 of FIG. 1.

Referring to FIG. 16, in operation 1610, the first UE 110 can select a UE having the greatest TA value, a UE having the smallest TA value, and a UE having a TA value between the greatest TA value and the smallest TA value from the set selected as shown in FIG. 14 or FIG. 15. The first UE 110 can perform the operation 160 to select the uniformly distributed UEs as the reference UEs from the neighboring UEs of the first UE 110.

In operation 1620, the first UE 110 can determine whether a triangular area including the selected UEs as vertices covers the first UE 110. When the triangular area covers the first UE 110, the first UE 110 can measure its position with little error. When the triangular area does not cover the first UE 110, the first UE 110 can proceed to operation 1640.

When the triangular area covers the first UE 110, the first UE 110 can generate its position information based on distances between the selected UEs and the first UE 110 in operation 1630. The first UE 110 can measure its position with little error based on the distances between the first UE 110 and the selected UEs. The first UE 110 can generate its position information based on the measured position.

In operation 1640, the first UE 110 can reselect UEs according to a preset rule. The preset rule can include various methods. For example, the first UE 110 can perform the operations of FIG. 15 and select the updated set as the reference UE selection set. For example, the first UE 110 can perform the operations of FIG. 16 and select other UEs as the reference UEs.

Figure 17:
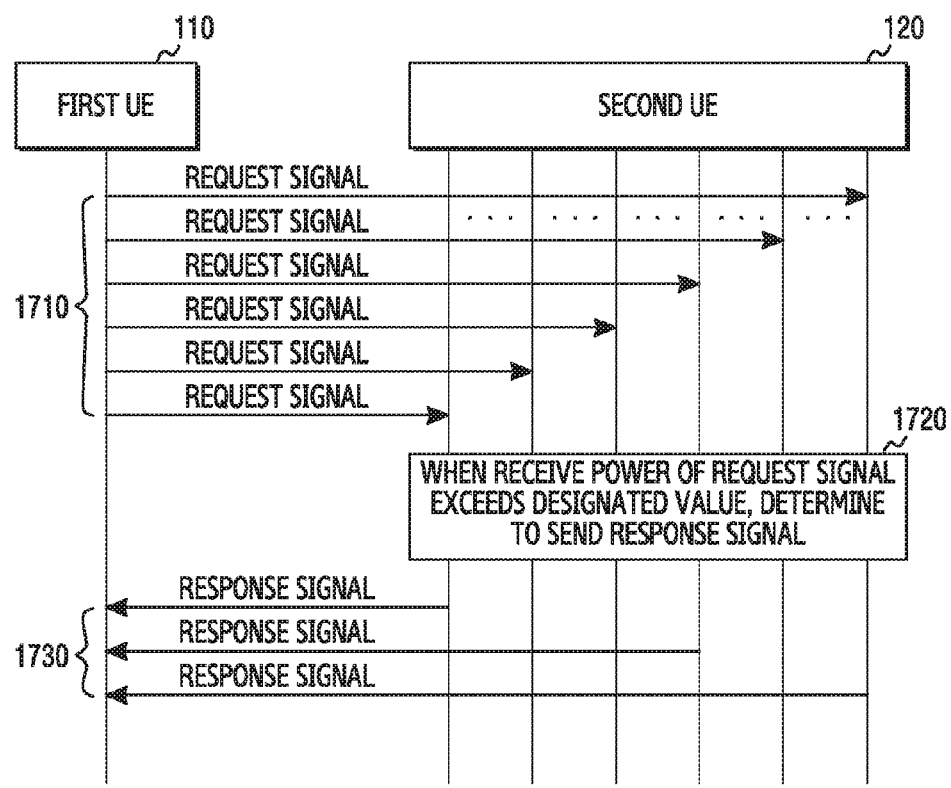
FIG. 17 is a signal flow diagram of a UE for measuring a position according to an embodiment of the present disclosure.

FIG. 17 is a signal flow diagram of a UE for measuring a position according to an embodiment of the present disclosure, which can generate in the first UE 110 and the second UE 120 of FIG. 1.

Referring to FIG. 17, in operation 1710, the first UE 110 can broadcast a request signal to the second UEs 120. The second UEs 120 can receive the request signal from the first UE 110. The second UEs 120 can compare a receive power of the request signal with a designated value, in order to determine whether the second UEs 120 are near the first UE 110 according to an embodiment of the present disclosure.

In operation 1720, when the receive power of the request signal is greater than the designated value, the second UEs 120 can determine to transmit the response signal to the first UE 110. The designated value can flexibility change according to the TA values of the second UEs 120. For example, when the second UEs 120 are close to the eNB 810 of FIG. 8, the designated value can be relatively small. For example, when the second UEs 120 are far from the eNB 810, the designated value can be relatively great. Although not depicted in FIG. 17, when the receive power of the request signal is smaller than the designated value, the second UEs 120 can determine not to transmit the response signal to the first UE 110.

In operation 1730, some of the second UEs 120 can transmit the response signal to the first UE 110. The first UE 110 can receive the response signals from some of the second UEs 120. The response signal can be used to calculate distances between the first UE 110 and some of the second UEs 120.

The first UE 110 can calculate distances between the first UE 110 and the second UEs 120 based on a TOA of the response signal, a TA value of the first UE 110, and TA values of the second UEs 120. The first UE 110 can generate a plurality of sets by grouping the second UEs 120 at the same distance from the first UE 110. The first UE 110 can select one of the sets according to a preset rule. The first UE 110 can select three UEs, as reference UEs, from the UEs of the selected set. The first UE 110 can select three UEs from the selected set as the reference UEs such that a triangular area including the three UEs as vertices covers the first UE 110. The first UE 110 can generate its position information based on distances between the three UEs and the first UE 110.

As such, the first UE 110 can measure its position with little error. The first UE 110 can generate its position information based on the measured position. The first UE 110 can transmit the position information to another UE or the eNB, or broadcast the position information.

Figure 18:
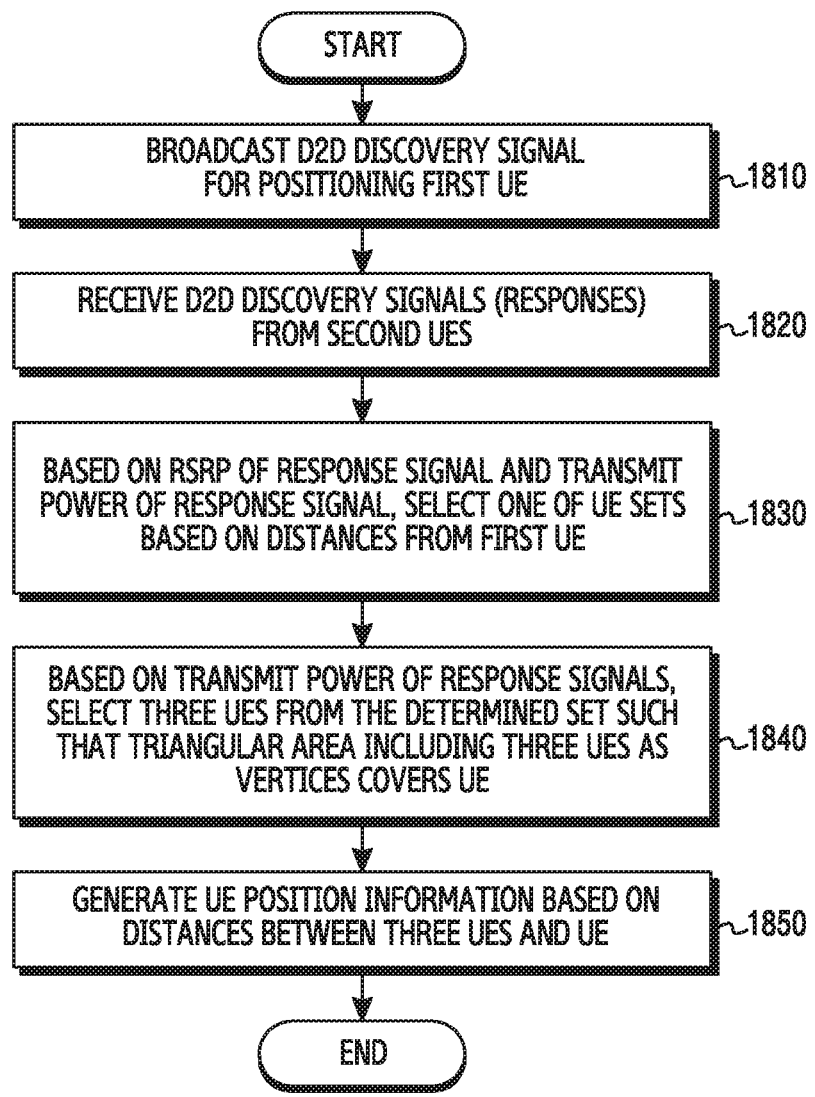
FIG. 18 is a flowchart of another UE operation method according to an embodiment of the present disclosure.

FIG. 18 is a flowchart of another UE operation method a, which can be fulfilled by the first UE 110 of FIG. 1, according to an embodiment of the present disclosure.

Referring to FIG. 18, in operation 1810, the first UE 110 can broadcast a D2D discovery signal for its positioning. The D2D discover signal can include its transmit power and a designated value. The transmit power of the D2D discovery signal can be used to calculate a path loss value between the first UE 110 and the second UE 120 of FIG. 1. The designated value can be determined by a distance between the first UE 110 and the eNB 810 of FIG. 8. Hence, the first UE 110 can filter some of its neighboring UEs.

In operation 1820, the first UE 110 can receive response signals (e.g., in a D2D discovery signal format) from the second UEs 120. The second UE 120 can determine a path loss value between the first UE 110 and the second UE 120 by comparing the transmit power of the first UE 110 of the D2D discovery signal with an RSRP of the D2D discovery signal. The second UE 120 can determine whether to transmit a response signal to the first UE 110 by comparing the path loss value and the designated value. When the path loss value is smaller than the designated value, the second UE 120 can transmit the response signal to the first UE 110. The response signal can include transmit power information of the second UE 120.

In operation 1830, based on the RSRP of the response signal and the transmit power of the response signal, the first UE 110 can select one of sets including the second UEs 120 positioned at the same distance from the first UE 110. Based on the RSRP of the response signal and the transmit power of the response signal, the first UE 110 can calculate the path loss value between the first UE 110 and the second UE 120. Based on the path loss value, the first UE 110 can group some of the second UEs 120 placed at the same distance from the first UE 110. For example, the first UE 110 can group some of the second UEs 120 at the same distance A into one group (or set), group some other UEs of the second UEs 120 at the same distance B into one group, and group some other UEs of the second UEs 120 at the same distance C into one group. The first UE 110 can select one of the groups as a group for selecting a reference UE.

In operation 1840, based on the transmit power of the response signal, the first UE 110 can select three UEs from the determined set such that a triangular area including the three second UEs 120 as vertices covers the first UE 110. The first UE 110 can perform the operation 1840 to select the reference UE. Hence, the first UE 110 can select the reference UE for assisting in the positioning of the first UE 110 with little error.

In operation 1850, the first UE 110 can generate its position information based on the distances between the three UEs and the first UE 110. The first UE 110 can measure its position based on the distances between the three UEs and the first UE 110. Based on the measured position, the first UE 110 can generate the position information.

The method of FIG. 18 can combine other embodiments for the positioning of the first UE 110. In the operations 1810 through 1850, the first UE 110 can measure its position with little error.

Figure 19:
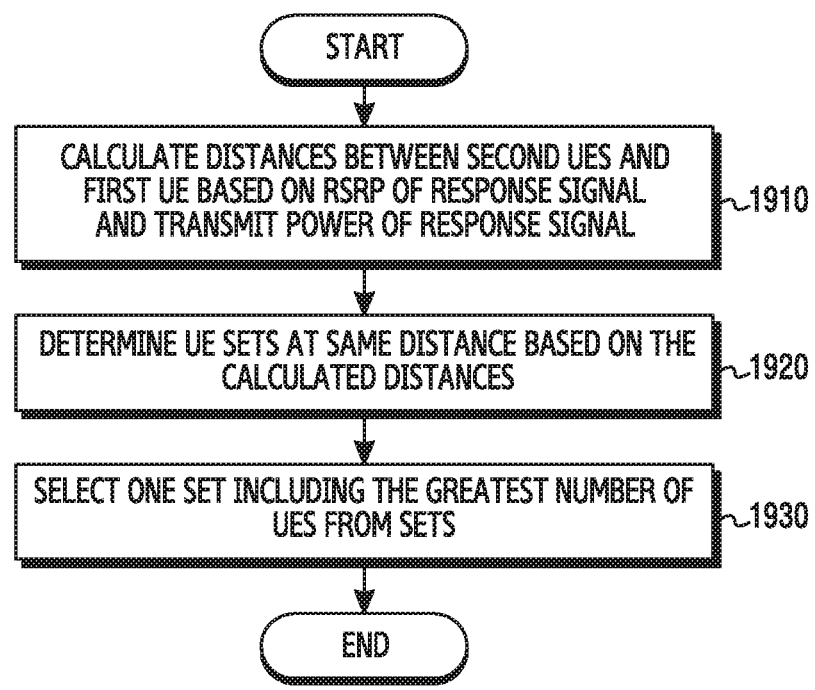
FIG. 19 is a flowchart of yet another UE operation method according to an embodiment of the present disclosure.

FIG. 19 is a flowchart of yet another UE operation method for selecting a set of UEs for reference UE selection, which can be fulfilled by the first UE 110 of FIG. 1, according to an embodiment of the present disclosure.

Referring to FIG. 19, in operation 1910, the first UE 110 can calculate a distance between the second UE 120 and the first UE 110 based on an RSRP of the response signal and a transmit power of the response signal. The first UE 110 can calculate a path loss value between the first UE 110 and the second UE 120 using a difference of the RSRP of the response signal and the transmit power of the response signal. Based on the path loss value, the first UE 110 can calculate the distance between the first UE 110 and the second UE 120.

In operation 1920, the first UE 110 can determine sets of UEs having the same distance based on the calculated distance. For example, the first UE 110 can group the second UEs 120 located apart at the same distance from the first UE 110. Thus, the first UE 110 can generate a plurality of sets.

In operation 1930, the first UE 110 can select one set including the greatest number of UEs among the sets. The operation 1930 can be replaced by other operation. For example, when the first UE 110 can select one set including the UEs uniformly distributed from the sets, as the reference UE selection set.

Figure 20:
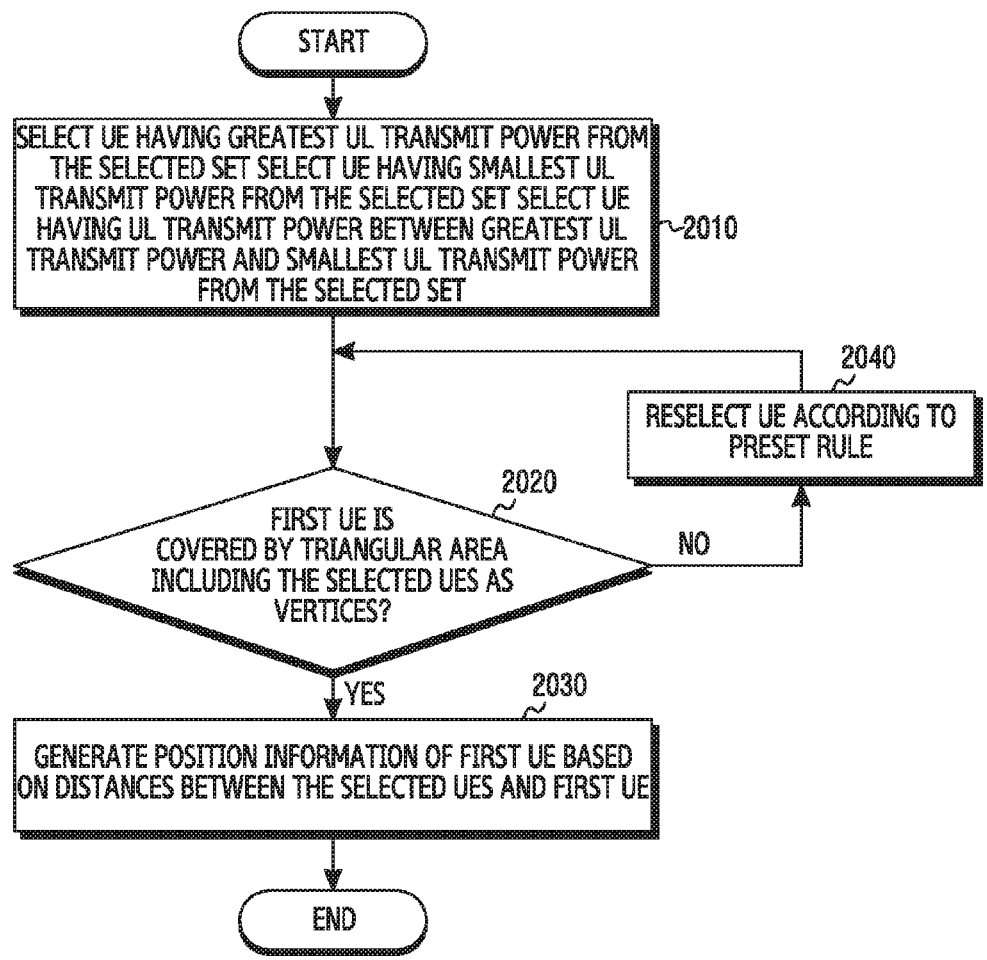
FIG. 20 is a flowchart of another UE operation method for generating UE position information according to an embodiment of the present disclosure.

FIG. 20 is a flowchart of another UE operation method for generating UE position information, which can be fulfilled by the first UE 110 of FIG. 1, according to an embodiment of the present disclosure.

Referring to FIG. 20, in operation 2010, the first UE 110 can select a UE having the greatest transmit power, a UE having the smallest transmit power, and a UE having a transmit power between the greatest transmit power and the smallest transmit power from the selected set. The first UE 110 can select reference UEs to measure its position with little error in operation 2010.

In operation 2020, the first UE 110 can determine whether it is covered by a triangular area including the selected UEs as vertices. When the triangular area covers the first UE 110, the first UE 110 can proceed to operation 2030. When the triangular area does not cover the first UE 110, the first UE 110 can proceed to operation 2040.

In operation 2030, the first UE 110 can generate its position information based on distances between the selected UEs and the first UE 110. The first UE 110 can measure its position based on the distances between the first UE 110 and the selected UEs using trilateration. The first UE 110 can generate its position information based on the measurement.

In operation 2040, the first UE 110 can reselect reference UEs according to a preset (designated) rule. For example, the first UE 110 can select a new candidate group for the reference UE selection in the operation 1930 of FIG. 19.

Figure 21:
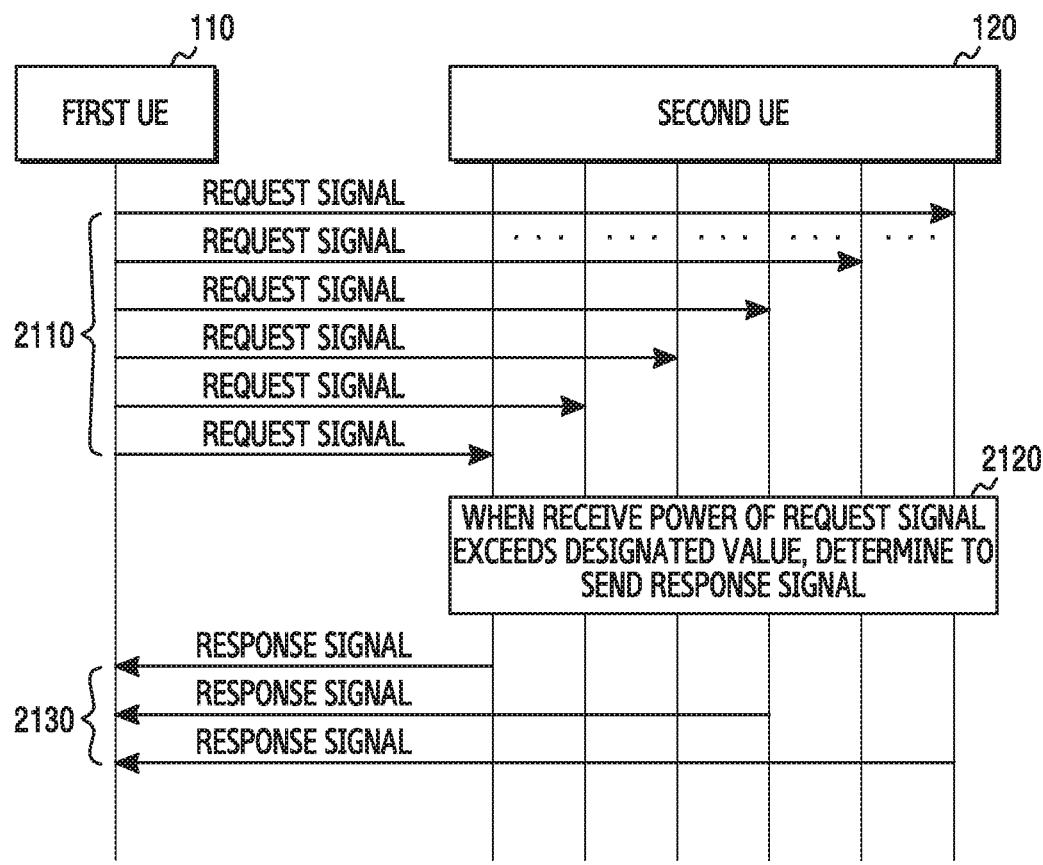
FIG. 21 is another signal flow diagram of a UE for measuring a position according to an embodiment of the present disclosure.

FIG. 21 is another signal flow diagram of a UE for measuring a position, which can generate in the first UE 110 and the second UE 120 of FIG. 1, according to an embodiment of the present disclosure.

Referring to FIG. 21, in operation 2110, the first UE 110 can broadcast a request signal. The request signal can be a D2D discovery signal. The request signal can include a transmit power of the D2D discovery signal and a designated value. The designated value can be used for the second UEs 120 to determine whether to transmit a response signal corresponding to the request signal to the first UE 110. All or some of the second UEs can receive the request signal.

In operation 2120, when the receive power of the request signal is greater than the designated value, the second UEs 120 can transmit the response signal. The response signal can include its transmit power information. The transmit power information can be used to calculate a path loss value between the first UE 110 and the second UE 120. Although not depicted in the operation 2120, when the receive power of the request signal is smaller than the designated value, the second UEs 120 may not transmit the response signal.

In operation 2130, some of the second UEs 120 can transmit the response signal to the first UE 110. The first UE 110 can receive the response signals from some of the second UEs 120.

The first UE 110 can calculate a path loss value between the first UE 110 and the second UE 120 based on an RSRP of the response signal and the transmit power information of the response signal. The first UE 110 can calculate a distance between the first UE 110 and the second UE 120 based on the path loss value. Based on the calculated distances, the first UE 110 can group some of the second UEs 120 sending the response signal. The first UE 110 can group some of the second UEs apart at the same distance from the first UE 110. Hence, the first UE 110 can generate a plurality of sets. The first UE 110 can select one of the sets. For example, the first UE 110 can select the set including the greatest number of the second UEs as a set for selecting reference UEs among the sets. The first UE 110 can select three UEs from the selected set such that a triangular area including the three second UEs 120 as vertices covers the first UE 110. The first UE 110 can select the three UEs based on the transmit power of the response signal. The first UE 110 can select, as the reference UEs, a UE having the greatest transmit power of the response signal, a UE having the smallest transmit power of the response signal, and a UE having a transmit power between the greatest transmit power and the smallest transmit power. The first UE 110 can measure its position based on distances between the selected UEs and the first UE 110. The first UE 110 can generate its position information based on the measurement.

Figure 22:
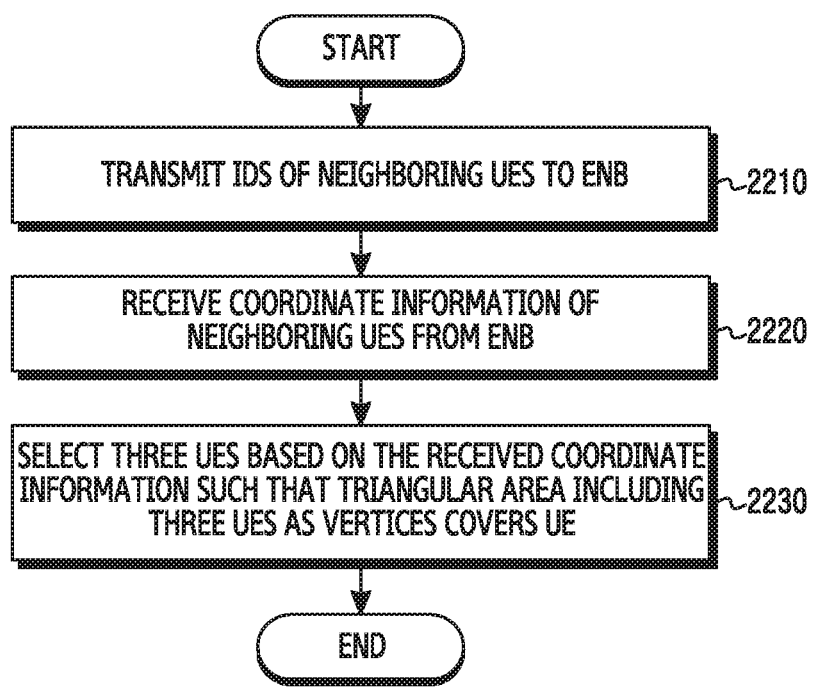
FIG. 22 is a flowchart of still another UE operation method according to an embodiment of the present disclosure.

FIG. 22 is a flowchart of still another UE operation method, which can be fulfilled by the first UE 110 of FIG. 1, according to an embodiment of the present disclosure.

Referring to FIG. 22, in operation 2210, the first UE 110 can transmit IDs of the second UEs 120 to the eNB 810 of FIG. 8. The first UE 110 can recognize the IDs of the second UEs 120 through D2D communication or D2D discovery. The first UE 110 can transmit the recognized (or obtained) IDs of the second UEs 120 to the eNB 810.

In operation 2220, the first UE 110 can receive coordinate information of the second UEs 120 (or neighboring UEs) from the eNB 810. The coordinate information can correspond to position information of the second UEs 120.

In operation 2230, the first UE 110 can select three UEs based on the coordinate information such that a triangular area including the selected UEs as vertices covers the first UE 110. The first UE 110 can perform the operation 2230 to measure its position with little error.

Although not depicted in FIG. 22, the first UE 110 can measure its position based on distances between the three selected three UEs and the first UE 110. The first UE 110 can generate its position information based on the measurement.

A method for operating a UE according to various embodiments can include broadcasting a request signal for positioning the UE, receiving response signals corresponding to the request signal from a plurality of UEs, based on received signal timings of the response signals and TA values of the UEs, selecting one of UE sets which are classified based on a distance from the UE, selecting three UEs from the selected set based on the TA values such that a triangular area comprising the three UEs as vertices covers the UE; and generating position information of the UE based on distances between the three UEs and the UE. Selecting the one set can include calculating the distances between the UEs and the UE based on the received signal timings, the TA values, and a TA value of the UE, classifying the UEs into the sets based on the calculated distances, and selecting the one set comprising the greatest number of UEs among the sets. Calculating the distances between the UEs and the UE can include calculating the distances between the UEs and the UE by adding the TA values of the UEs to the received signal timings of the response signals and subtracting the TA value of the UE.

Selecting the three UEs can include selecting a UE having the greatest TA value, a UE having the smallest TA value, and a UE having the TA value between the greatest TA value and the smallest TA value from the UEs of the selected set such that the triangular area covers the UE.

The response signal can be transmitted from each of the UEs when a receive power of the request signal received at the UEs is greater than a designated value. The designated value can be determined based on the TA value of the UEs.

The method can further include obtaining the TA values of the UEs from the UEs using D2D signals.

The method can further include, when the UE is RRC-idle, requesting a TA value from an eNB which serves the UE, and receiving the TA value from the eNB.

The method can further include, when the UE is RRC-idle, determining, as a TA value of the UE, a TA value of a signal having the highest RSRP among received D2D signals.

A method for operating a UE can include broadcasting a D2D discovery signal for positioning the UE, receiving response signals corresponding to the D2D discovery signal from a plurality of UEs, based on an RSRP of the response signals and a receive power of the response signals, selecting one of UE sets which are classified based on a distance from the UE, selecting three UEs from the selected set based on the transmit power of the response signal such that a triangular area comprising the three UEs as vertices covers the UE, and generating position information of the UE based on distances between the three UEs and the UEs.

As above, the UE 110 (or the first UE 110) and its operating method can provide the method for positioning the UE 110 with the assistant of the UE 120 near the UE 110. Hereafter, a method for positioning the UE 110 with the assistant of an eNB which is not mobile is described. When the UE is positioned among a plurality of nodes with no neighboring UEs, the position of the UE 110 can be measured as follows.

Figure 23:
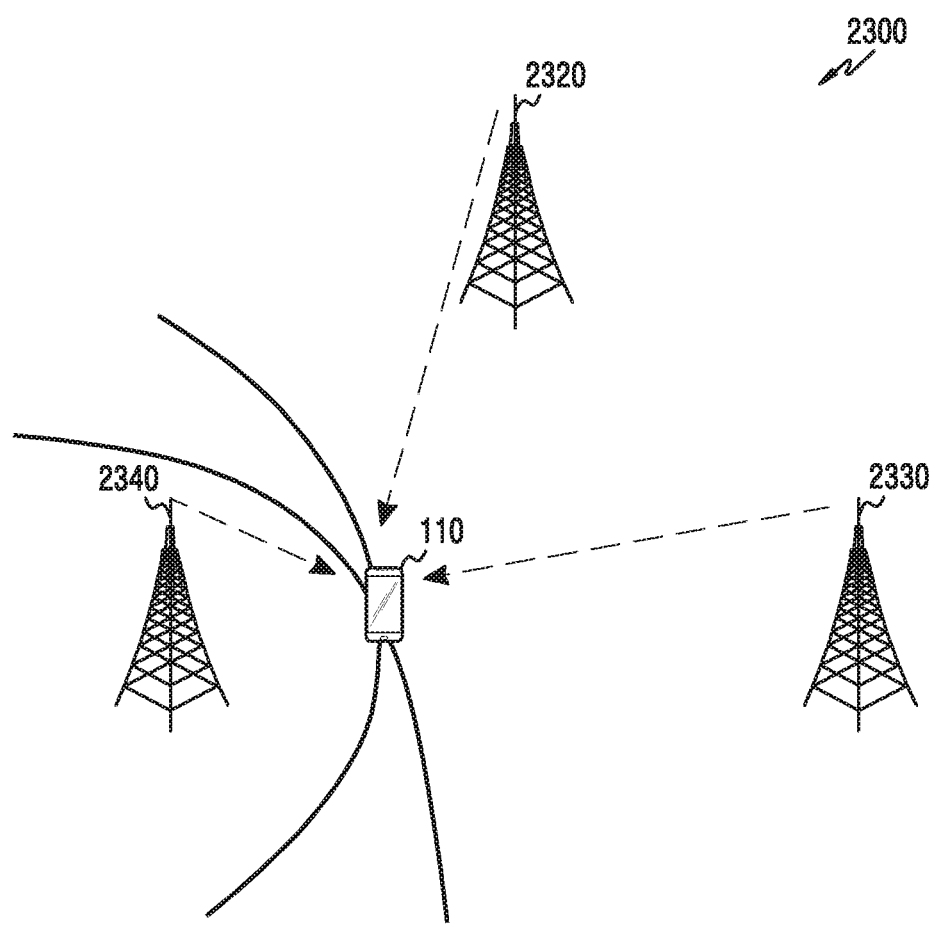
FIG. 23 is a diagram of UE positioning using a plurality of nodes according to an embodiment of the present disclosure.

FIG. 23 depicts UE positioning using a plurality of nodes according to an embodiment of the present disclosure.

Referring to FIG. 23, a system 2300 can include the UE 110 of FIG. 1, an eNB 2320, an eNB 2330, and an eNB 2340.

The UE 110 can require positioning. The eNBs 2320, 2330, and 2340 can assist in the positioning of the UE 110. The eNBs 2320, 2330, and 2340 can indicate fixed nodes.

The UE 110 can measure its position using a receive (Rx) timing of reference signals. The positioning method using the received signal timing of the reference signals can be referred to as a ground position based method. 3GPP leading the standardization of the wireless communication technology is working on various positioning methods. 3GPP is working on the ground position based method to improve the UE positioning performance.

Positions of the eNBs 2320, 2330, and 2340 can be known in advance. The eNBs 2320, 2330, and 2340 each can transmit a reference signal to the UE 110. The UE 110 can estimate a propagation delay using received signal timing of the received reference signals. The UE 110 can calculate an RSTD using the received signal timing of the received reference signals based on Equation 3.

$$RSTD_{s,i} = \sqrt{(x_t-x_i)^2+(y_t-y_i)^2} - \sqrt{(x_t-x_s)^2+(y_t-y_s)^2}$$ Equation 3

$RSTD_{s,i}$ denotes an RSTD of the reference signals with two eNBs, $x_t$ and $y_t$ denote a position of the UE 110, $x_i$ and $y_i$ denote one (e.g., the eNB 2320) of the eNBs 2320, 2330 and 2340, and $x_s$ and $y_s$ can denote a position of another of the eNBs 2320, 2330, and 2340.

The UE 110 can calculate a hyperbolic function by measuring two or more different RSTDs. The UE 110 can estimate its position using an intersection of the calculated hyperbolic functions. The UE 110 may upload the RSTD to a location server. The location server can calculate a hyperbolic function based on the RSTD. The location server can estimate the position of the UE 110 from an intersection of the calculated hyperbolic functions.

The eNB 2320 can be accessed by the UE 110. The eNB 2330 and the eNB 2340 can be neighboring eNBs of the UE 110. The UE 110 can receive reference signals from the eNBs 2320, 2330, and 2340. The UE 110 can calculate two RSTDs using RSTDs of the received reference signals. For example, the UE 110 can calculate the two RSTDs using the RSTDs of the received reference signals based on Equation 4.

$$r_{(2,1)} = \sqrt{(x_t-x_2)^2+(y_t-y_2)^2}/c - \sqrt{(x_t-x_1)^2+(y_t-y_1)^2}/c+(T_2-T_1)+(n_2-n_1)$$

$$r_{(3,1)} = \sqrt{(x_t-x_3)^2+(y_t-y_3)^2}/c - \sqrt{(x_t-x_1)^2+(y_t-y_1)^2}/c+(T_3-T_1)+(n_3-n_1)$$ Equation 4 c can denote the speed of light, $x_t$ and $y_t$ can denote a real position of the UE 110, and $n_1$ can denote a detection error when the received signal timing is detected from the reference signals received from the eNBs. The UE 110 can obtain its position ($x_t$, $y_t$) based on the two hyperbolic curves of Equation 4. The UE 110 can transmit Equation 4 to the location server. The location server can obtain the UE position ($x_t$, $y_t$) based on the two hyperbolic curves of Equation 4.

A separate positioning algorithm can be required to obtain ($x_t$, $y_t$) corresponding to the position of the UE 110 using the two hyperbolic equations of Equation 4 which is a bivariate quadratic function. The positioning algorithm can include a method for directly obtaining ($x_t$, $y_t$) using an algorithm suggested by Fang, and a method for obtaining ($x_t$, $y_t$) through recursive estimation using a Taylor series based algorithm.

As such, the UE 110 or the location server can measure the position of the UE 110.

Figure 24:
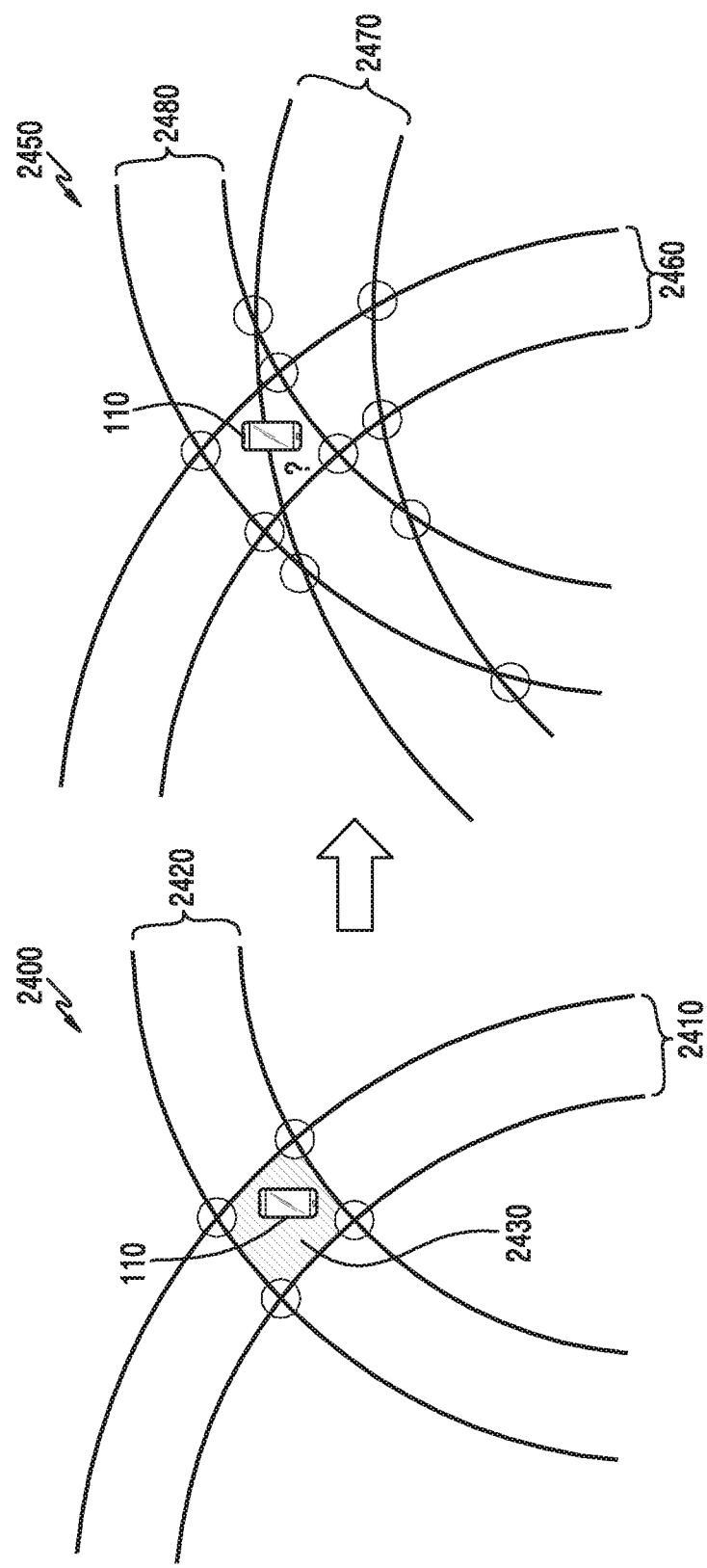
FIG. 24 is a diagram of an example of UE positioning using a received signal time difference (RSTD) and a fixed node according to an embodiment of the present disclosure.

FIG. 24 depicts a UE positioning method using an RSTD and a fixed node according to an embodiment of the present disclosure.

Referring to FIG. 24, a system 2400 can include the UE 110 of FIG. 1 and two nodes (not shown).

The UE 110 can require positioning. The UE 110 can directly measure its position. The UE 110 may measure its position indirectly by sending RSTD information to a location server. Hereafter, while the UE 110 measures its position to ease the understanding, it can be interpreted as including a case where the location server can measure the position of the UE 110.

The UE 110 can calculate the RSTD using the received signal timing of reference signals received from the two nodes. The UE 110 can apply an expected error size to a RSTD-based hyperbolic curve. The error size can result from path loss, fading, interference, and so on. The UE 110 can obtain the hyperbolic curve by applying the expected error size to the RSTD-based hyperbolic curve. For example, the UE 110 can calculate a hyperbolic curve of a curve set 2410 and a curve set 2420 by applying the error size to the hyperbolic curve. The UE 110 can specify an area where the curve set 2420 and the curve set 2420 overlap, as an error area 2430.

A system 2450 can include the UE 110 and four nodes (not shown).

The UE 110 can calculate an RSTD using a received signal timing of reference signals received from three nodes. The UE 110 can calculate a curve set 2460 and a curve set 2470 by applying an expected error size to the RSTD-based hyperbolic curve. The UE 110 can receive a reference signal from other node in order to measure its accurate position (or to reduce an error area). The UE 110 can calculate a curve set 2480 using a received signal timing of the reference signal. While the UE 110 calculates the curve set 2480 to reduce the error area, the UE 110 may not be able to reduce the error area in the system 2450. The UE 110 may not be able to specify the error area in the system 2450.

The UE 110 can address a problem arising in the system 2450 by use of two nodes (or two eNBs) and one assistant node. Hence, the UE 110 can measure its position with little error.

Figure 25:
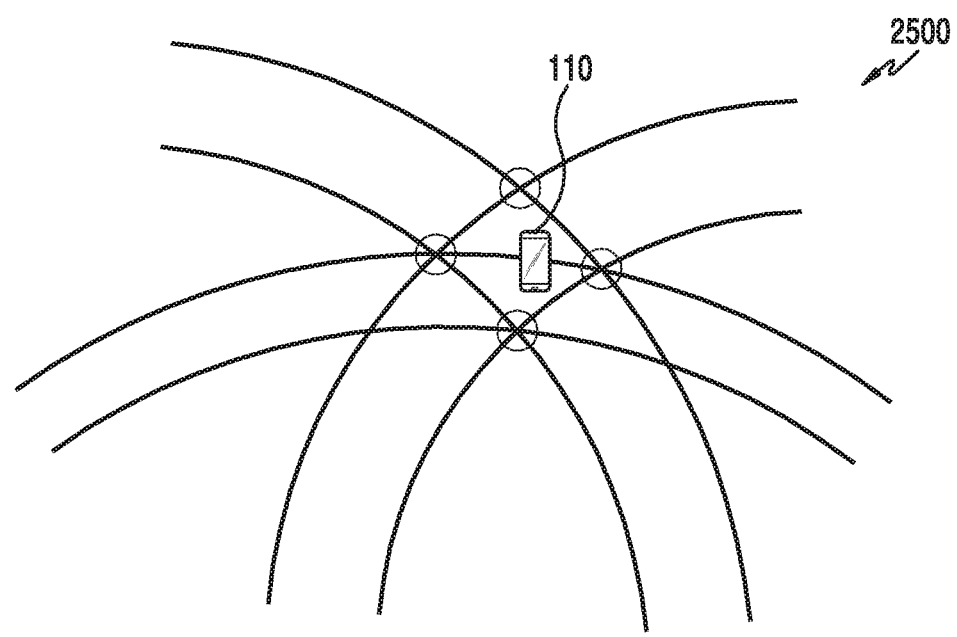
FIG. 25 is a diagram of another example of UE positioning using an RSTD and a fixed node according to an embodiment of the present disclosure.

FIG. 25 depicts another UE positioning method using an RSTD and a fixed node according to an embodiment of the present disclosure.

Referring to FIG. 25, a system 2500 can include the UE 110 of FIG. 1 and a plurality of nodes (not shown).

The UE 110 can obtain a hyperbolic curve set by applying an expected error to the RSTD. Unlike FIG. 24, the UE 110 may not use intersections of the hyperbolic curves. The UE 110 can estimate an overlapping area through approximation and matrix calculation of the produced hyperbolic curves, and position the UE 110 at a center of a corresponding overlapping area. However, for doing so, the UE 110 may need to set an initial value. When a wrong initial value is set, the UE 110 cannot reduce the error area due to performance degradation. Also, such a method can increase a matrix size for obtaining the error area and thus degrade the performance of the UE 110 due to computational complexity.

The UE 110 can address the problem in the system 2500 by use of two nodes (or two eNBs) and one assistant node. Hence, the UE 110 can measure its position with little error.

Figure 26:
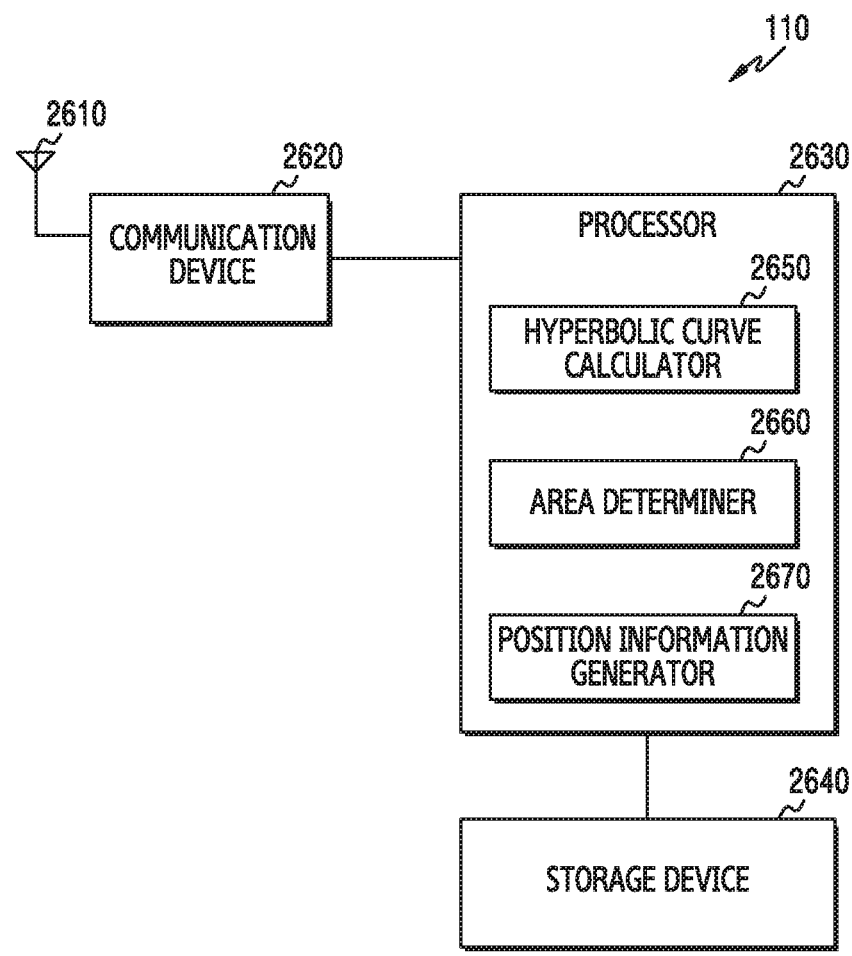
FIG. 26 is another block diagram of a UE according to an embodiment of the present disclosure.

FIG. 26 is another block diagram of a UE, which can be included in the UE 110, according to an embodiment of the present disclosure.

Referring to FIG. 26, the UE 110 can include an antenna 2610, a communication device 2620, a processor 2630, and a storage device 2640.

The antenna 2610 can include one or more antennas. The antenna 2610 can be configured for MIMO.

The communication device 2620 can transmit or receive a signal over a radio channel.

The communication device 2620 can convert a baseband signal to a bit string and vice versa according to a physical layer standard of a system. For example, for data transmission, the communication device 2620 can generate complex symbols by encoding and modulating a transmit bit stream. For example, when receiving data, the communication device 2620 can restore a receive bit stream by demodulating and decoding a baseband signal.

The communication device 2620 can up-convert the baseband signal to an RF signal and transmit the RF signal through the antenna 2610. The communication device 2620 can down-convert an RF signal received over the antenna 2610 to a baseband signal. For example, the communication device 2620 can include a transmit filter, a receive filter, an amplifier, a mixer, an oscillator, a DAC, and an ADC. The communication device 2620 may be referred to as a transmitter, a receiver, and/or a transceiver.

The communication device 520 can receive reference signals (or downlink (DL) signals) from a plurality of fixed nodes (e.g., the eNB 2320). The reference signal can be used to a hyperbolic curve for positioning of the UE 110.

The processor 2630 can control the operations of the UE 110. For example, the processor 2630 can transmit or receive a signal through the communication device 2620. The processor 2630 can record data in the storage device 2640 and read the recorded data from the storage device 2640. For doing so, the processor 2630 may indicate a set of processors. For example, the processor 2630 can include a CP for controlling the communication and an AP for controlling a higher layer such as an application program.

The processor 2630 can include a hyperbolic curve calculator 2650, an area determiner 2660, and a position information generator 2670.

The hyperbolic curve calculator 2650 can calculate an RSTD based on reference signals received from two primary nodes. The hyperbolic curve calculator 2650 can calculate one hyperbolic curve based on the calculated RSTD. The hyperbolic curve calculator 2650 can calculate a first hyperbolic area by applying an estimated error size to the calculated hyperbolic curve.

The hyperbolic curve calculator 2650 can calculate an RSTD based on reference signals received from one primary node and one secondary node. The secondary node can be a fixed node near to one of the two primary nodes. The hyperbolic curve calculator 2650 can calculate one hyperbolic curve based on the calculated RSTD. The hyperbolic curve calculator 2650 can calculate a second hyperbolic area by applying an estimated error size to the calculated hyperbolic curve.

The area determiner 2660 can determine an error area based on the first hyperbolic area and the second hyperbolic area. The area determiner 2660 can determine an overlapping area of the first hyperbolic area and the second hyperbolic area, as the error area.

The position information generator 2670 can generate a corrected hyperbolic curve based on the determined error area. For example, the position information generator 2670 can specify an interaction between a connection line between the primary nodes and a boundary line of the overlapping area. The number of intersections can be two. Since the secondary node is close to one of the primary nodes, the connection line between the primary nodes can penetrate the overlapping area.

The position information generator 2670 can calculate a middle point of the two intersections. The position information generator 2670 can calculate a corrected hyperbolic curve based on the intersections.

The position information generator 2670 can specify a middle point of the overlapping area.

The position information generator 2670 can calculate can position of the UE 110 based on the corrected hyperbolic curve or the middle point of the overlapping area. The position information generator 2670 can generate position information of the UE 110 based on the measurement.

The storage device 2640 can store a control command code for controlling the UE 110, control data, or user data. The storage device 2640 and include at least one of a volatile memory and a nonvolatile memory. The nonvolatile memory can include a ROM, PROM, an EPROM, an EEPROM, a flash memory, a PRAM, a MRAM, a RRAM, and a FRAM. The volatile memory can include at least one of a DRAM, an SRAM, an SDRAM, a PRAM, an MRAM, an RRAM, and a FeRAM.

The storage device 2640 can include a nonvolatile medium such as a HDD, a SSD, an eMMC, and a UFS.

Figure 27:
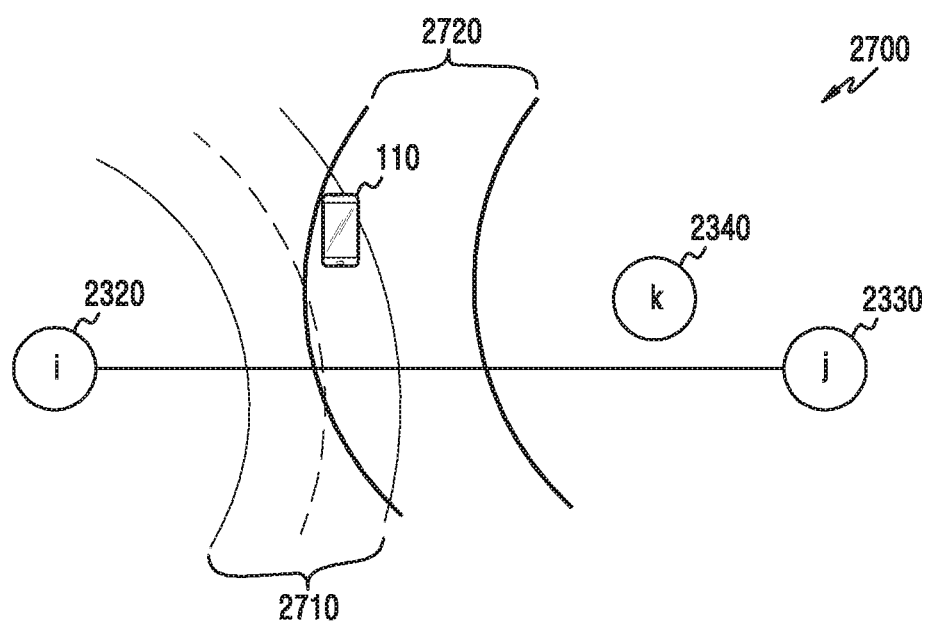
FIG. 27 is a diagram of hyperbolic area calculation according to an embodiment of the present disclosure.

FIG. 27 depicts hyperbolic area calculation according to an embodiment of the present disclosure.

Referring to FIG. 27, a system 2700 can include the UE 110, the eNB 2320, the eNB 2330, and the eNB 2340. The eNBs 2320, 2330, and 2340 can be referred to as nodes 2320, 2330, and 2340. The node 2320 and the node 2330 can be referred to primary nodes. The node 2340 can be referred to as a secondary node.

The node 2320 and the node 2330 can transmit a reference signal to the UE 110. The UE 110 can calculate an RSTD using received signal timings of the received reference signals. The UE 110 can generate a hyperbolic curve using the RSTD. The UE 110 can calculate a hyperbolic area by applying an estimated error size to the generated hyperbolic curve. For example, the UE 110 can generate (or calculate) a hyperbolic area 2710 by applying the estimated error size to the generated hyperbolic curve.

The node 2320 and the node 2340 can transmit a reference signal to the UE 110. The UE 110 can calculate an RSTD using received signal timings of the received reference signals. The UE 110 can generate a hyperbolic curve using the RSTD. The UE 110 can calculate a hyperbolic area by applying an estimated error size to the generated hyperbolic curve. For example, the UE 110 can generate (or calculate) a hyperbolic area 2720 by applying the estimated error size to the generated hyperbolic curve.

Figure 28:
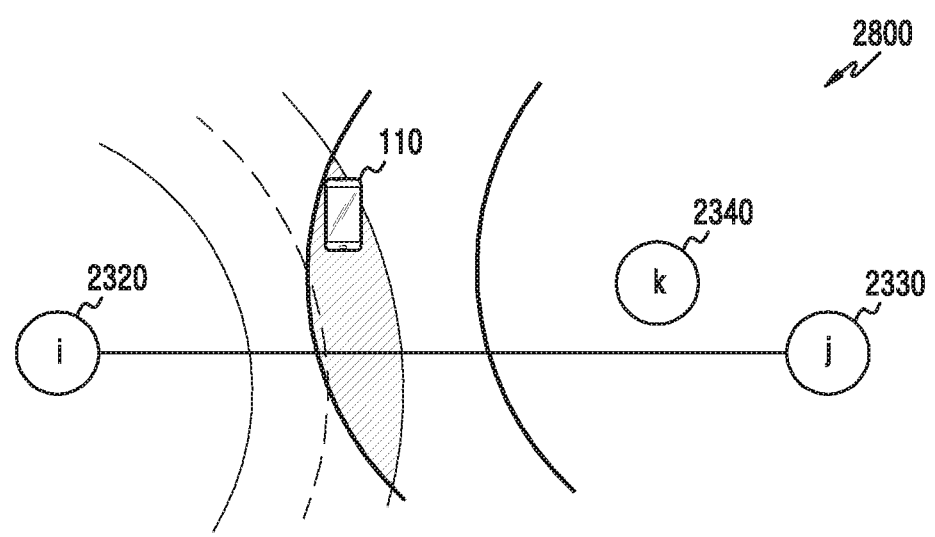
FIG. 28 is a diagram of an error area specified according to an embodiment of the present disclosure.

FIG. 28 depicts an error area specified according to an embodiment of the present disclosure.

Referring to FIG. 28, a system 2800 can include the UE 110, the eNB 2320, the eNB 2330, and the eNB 2340.

The UE 110 can specify an overlapping area of the hyperbolic area 2710 and the hyperbolic area 2720 of FIG. 27. The UE 110 can specify the overlapping area as an error area. The UE 110 can measure its position with little error by reducing the error area as shown in FIG. 29.

Figure 29:
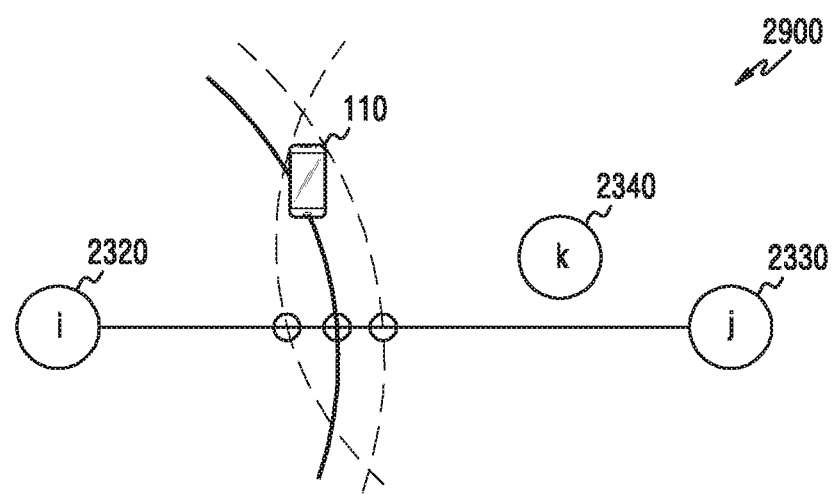
FIG. 29 is a diagram of calculation for a corrected hyperbolic curve according to an embodiment of the present disclosure.

FIG. 29 depicts corrected hyperbolic curve calculation according to an embodiment of the present disclosure.

Referring to FIG. 29, a system 2900 can include the UE 110, the eNB 2320, the eNB 2330, and the eNB 2340.

The UE 110 can calculate intersections of a boundary of the specified error area and a connection line of the node 2320 and the node 2330. As shown in FIG. 29, two intersections can be produced because the node 2340 is located near the node 2330. Accordingly, the connection line can penetrate the error area. Since the connection line penetrates the error area, the error area boundary and the connection line can produce two intersections.

Based on the two intersections, the UE 110 can calculate a middle point of the two intersections. The UE 110 can calculate a corrected hyperbolic curve based on the middle point.

Based on the corrected hyperbolic curve, the UE 110 can measure its position with little error. The UE 110 can generate its position information based on the measurement.

Figure 30:
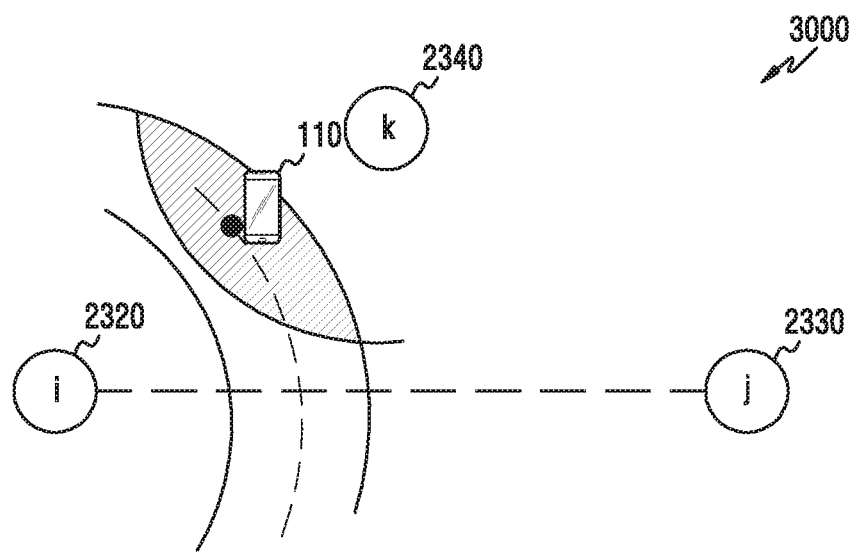
FIG. 30 is a diagram of UE positioning according to an embodiment of the present disclosure.

FIG. 30 depicts UE positioning according to an embodiment of the present disclosure.

Referring to FIG. 30, a system 3000 can include the UE 110, the eNB 2320, the eNB 2330, and the eNB 2340.

The UE 110 can calculate a middle point of the specified error area as shown in FIG. 28. The UE 110 can measure the middle point as its position. The UE 110 can measure its position with little error as shown in FIG. 30. The UE 110 can generate its position information based on the measurement.

Figure 31:
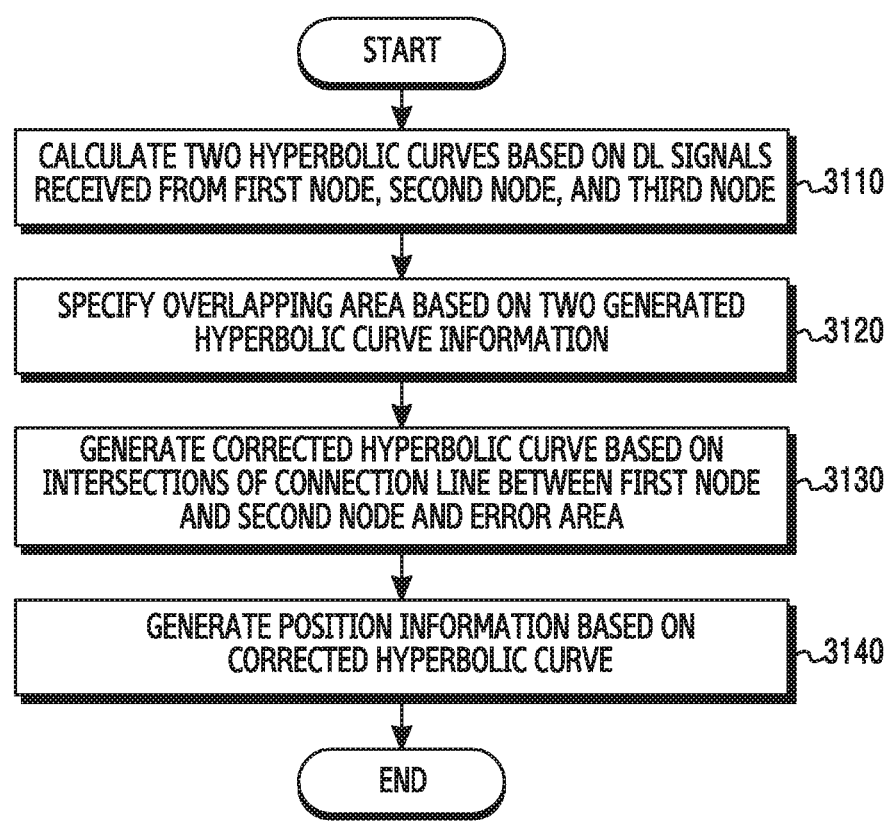
FIG. 31 is a flowchart of a UE operation method for measuring a position using nodes according to an embodiment of the present disclosure.

FIG. 31 is a flowchart of a UE operation method for measuring a position using nodes, which can be fulfilled by the UE 110 of FIG. 1, according to an embodiment of the present disclosure.

Referring to FIG. 31, in operation 3110, the UE 110 can calculate two hyperbolic curves based on DL signals received from a first node, a second node, and a third node. The first node and the second node can be primary nodes. The third node can a neighbor of the second node, and can be a secondary node. The first node, the second node, and the third node can correspond to the node 2320, the node 2330, and the node 2340 respectively. The DL signal can be a reference signal. The UE 110 can calculate an RSTD by receiving DL signals from the first node and the second node. The UE 110 can calculate a first hyperbolic curve based on the RSTD. The UE 110 can calculate an RSTD by receiving a DL signal from the third node. The UE 110 can calculate a second hyperbolic curve based on the RSTD.

In operation 3120, the UE 110 can specify an overlapping area based on information of the two generated hyperbolic curves. The UE 110 can calculate a first hyperbolic area by applying an expected error size to the first hyperbolic curve. The UE 110 can calculate a second hyperbolic area by applying the expected error size to the second hyperbolic curve. The UE 110 can specify an overlapping area of the first hyperbolic area and the second hyperbolic area. The UE 110 can specify the overlapping area as the error area.

In operation 3130, the UE 110 can generate a corrected hyperbolic curve based on intersections of a connection line between the first node and the second node and the error area. The UE 110 can calculate the connection line between the first node and the second node. The UE 110 can calculate the intersections of the error area boundary and the connection line. Two intersections can be produced. Based on the two intersections, the UE 110 can calculate a middle point of the two intersections. The UE 110 can generate the corrected hyperbolic curve based on the calculated middle point.

In operation 3140, the UE 110 can generate position information based on the corrected hyperbolic curve. The UE 110 can measure its position with little error based on the corrected hyperbolic curve. Based on the measurement, the UE 110 can generate its position information.

Figure 32:
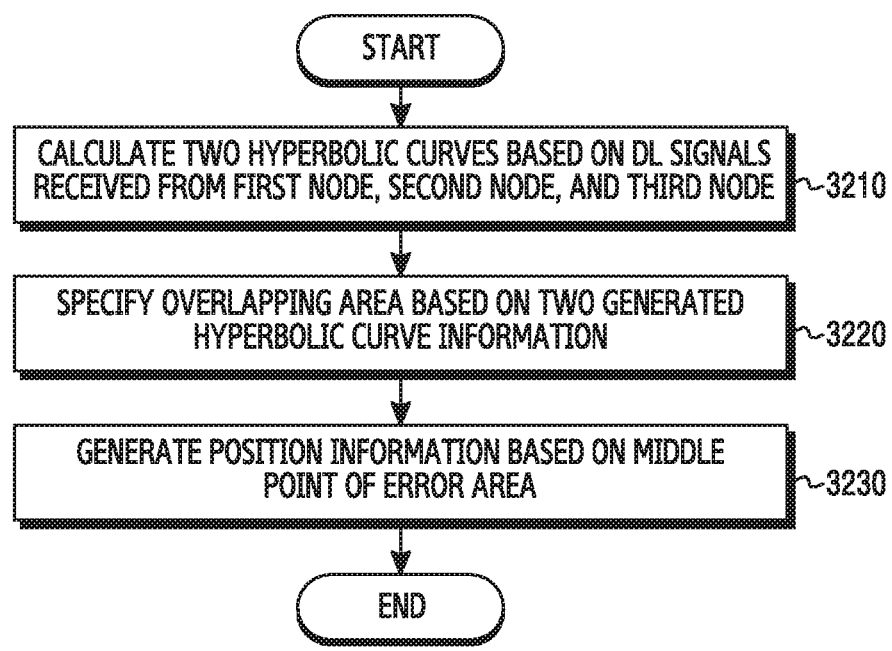
FIG. 32 is a flowchart of another UE operation method for measuring a position using nodes according to an embodiment of the present disclosure.

FIG. 32 is a flowchart of another UE operation method for measuring a position using nodes according to an embodiment of the present disclosure.

Referring to FIG. 32, operation 3210 and operation 3220 can correspond to the operation 3110 and the operation 3120 of FIG. 31.

In operation 3230, the UE 110 can generate position information based on a middle point of an error area. The UE 110 can calculate the middle point in the error specified in the operation 3220. The UE 110 can measure the middle point as its position. Based on the measurement, the UE 110 can generate its position information.

Figure 33:
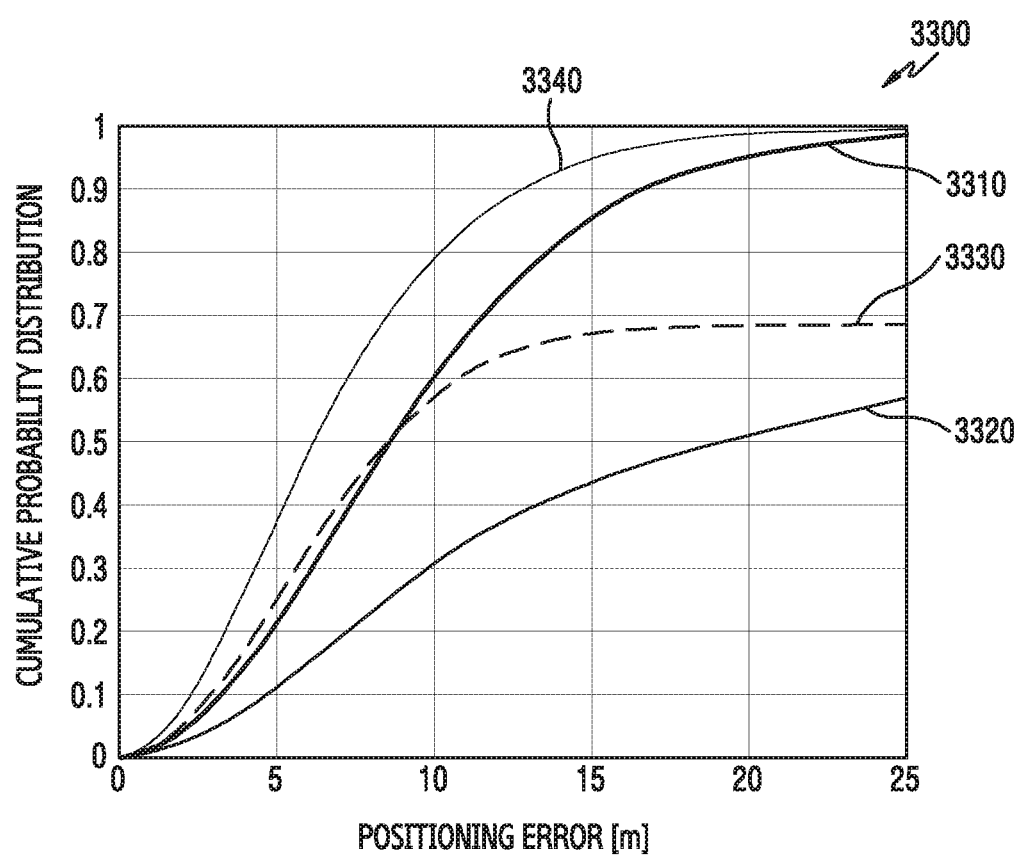
FIG. 33 is a graph of positioning effects using nodes according to an embodiment of the present disclosure.

FIG. 33 is a graph of positioning effects using nodes according to an embodiment of the present disclosure.

Referring to FIG. 33, a graph 3300 can include a curve 3310, a curve 3320, a curve 3330, and a curve 3340. A horizontal axis of the graph 3300 can indicate a positioning error and its unit can be a meter. A vertical axis of the graph 330 can indicate a cumulative probability distribution and its unit can be a ratio.

Since the vertical axis of the graph 3300 indicates the cumulative probability distribution, the curve can achieve better performance as it gets closer to the top left of the graph 3300.

The curve 3310 can indicate a positioning method using three nodes, the curve 3320 can indicate a positioning method using intersections of a hyperbolic curve generated with five nodes, the curve 3330 can indicate a positioning method using the Taylor series, and the curve 3320 can indicate a positioning method using a primary node and a secondary node.

The positioning method corresponding to the curve 3310 can achieve lower performance than the positioning method corresponding to the curve 3340 because it does not correct the error area. The positioning method corresponding to the curve 3320, which cannot specify the intersection, can achieve lower performance than the positioning method corresponding to the curve 3340. The positioning method corresponding to the curve 3330, which fails in the initial value setting, can achieve lower performance than the positioning method corresponding to the curve 3340.

The apparatus and the operating method of the UE according to various embodiments of the present disclosure can efficiently measure the position of the UE using other UEs.

The methods described in the claims or the specification according to various embodiments of the present disclosure can be implemented in software, firmware, hardware, or in their combinations.

As for the software, a computer-readable storage medium for storing one or more programs (software modules) can be provided. One or more programs stored in the computer-readable storage medium can be configured for execution by one or more processors of an electronic device. One or more programs can include instructions for enabling the electronic device to execute the methods according to the various embodiments of the present disclosure.

Such a program (software module, software) can be stored to a random access memory, a non-volatile memory including a flash memory, a ROM, an EEPROM, a magnetic disc storage device, a compact disc (CD)-ROM, digital versatile discs (DVDs) or other optical storage devices, and a magnetic cassette. Alternatively, the programs can be stored to a memory combining part or all of those recording media. A plurality of memories may be equipped.

The programs can be stored in an attachable storage device accessible via a communication network such as Internet, Intranet, local area network (LAN), wide LAN (WLAN), or storage area network (SAN), or a communication network by combining these networks. The storage device can access the electronic device through an external port. A separate storage device may access the electronic device over the communication network.

In the above-described various embodiments of the present disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element and the elements expressed in the singular form may be configured as a plurality of elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a user equipment (UE), the method comprising:
    broadcasting a request signal for positioning the UE;
    receiving from each of a plurality of UEs a response signal corresponding to the request signal;
    identifying a set among at least one UE set determined according to a distance between the UE and each of the plurality of UEs, the distance being determined based on a received signal timing of the response signal and timing advance (TA) values of the plurality of UEs;
    identifying three UEs among UEs included in the identified set, based on the TA values such that a triangular area comprising the three UEs as vertices covers the UE; and
    generating position information of the UE based on distances between the UE and each of the identified three UEs.

2. The method of claim 1, wherein the identifying of the set comprises:
    determining the distance between each of the plurality of UEs and the UE based on the received signal timing, the TA values of the plurality of UEs, and a TA value of the UE;
    determining the plurality of UEs into the at least one UE set based on the determined distance; and
    identifying the set comprising a greatest number of UEs among the at least one UE set.

3. The method of claim 2, wherein the determining of the distance between each of the plurality of UEs and the UE comprises:
    determining the distance between each of the plurality of UEs and the UE by adding the TA values of the plurality of UEs to the received signal timing of the response signals and subtracting the TA value of the UE.

4. The method of claim 1, wherein the identifying of the three UEs comprises:
    identifying a first UE having a greatest TA value, a second UE having a smallest TA value, and a third UE having a TA value between the greatest TA value and the smallest TA value from the UEs included in the identified set such that the triangular area covers the UE.

5. The method of claim 1,
    wherein the response signal is transmitted from each of the plurality of UEs when a receive power of the broadcasted request signal received at each of the plurality of UEs is greater than a designated value, and
    wherein the designated value is determined based on the TA value of the plurality of UEs.

6. The method of claim 1, further comprising:
    obtaining the TA values of the plurality of UEs using device to device (D2D) signals from the plurality of UEs.

7. The method of claim 1, further comprising:
    when the UE is radio resource control (RRC)-idle, requesting a TA value from an evolved NodeB (eNB) which serves the UE; and
    receiving the TA value from the eNB.

8. The method of claim 1, further comprising:
when the UE is radio resource control (RRC)-idle, determining, as a TA value of the UE, a TA value of a signal having a highest reference signal received power (RSRP) among received device to device (D2D) signals.

9. A method for operating a user equipment (UE), the method comprising:
broadcasting a device to device (D2D) discovery signal for positioning the UE;
receiving, from each of a plurality of UEs, a response signal corresponding to the D2D discovery signal;
identifying a set among at least one UE set determined according to a distance between the UE and each of the plurality of UEs, the distance being determined based on a reference signal received power (RSRP) of the response signal;
identifying three UEs among UEs included in the identified set, based on timing advance (TA) values for the UEs included in the identified set, such that a triangular area comprising the three UEs as vertices covers the UE; and
generating position information of the UE based on distances between the UE and each of the identified three UEs.

10. An apparatus of a user equipment (UE), the apparatus comprising:
a transceiver; and
a processor operatively coupled with the transceiver, wherein the processor is configured to:
broadcast a request signal for positioning the UE,
receive, from each of a plurality of UEs, a response signal corresponding to the request signal,
identify a set among at least one UE set determined according to a distance between the UE and each of the plurality of UEs, the distance being determined based on a received signal timing of the response signal and timing advance (TA) values of the plurality of UEs,
identify three UEs among UEs included in the identified set, based on the TA values such that a triangular area comprising the three UEs as vertices covers the UE; and
generate position information of the UE based on distances between the UE and each of the identified three UEs.

11. The apparatus of claim 10, wherein the processor is further configured to:
determine the distance between each of the plurality of UEs and the UE based on the received signal timing, the TA values of the plurality of UEs, and a TA value of the UE,
determine the plurality of UEs into the at least one UE set based on the determined distance, and
identify the set comprising a greatest number of UEs among the at least one UE set.

12. The apparatus of claim 11, wherein the processor is further configured to determine the distance between each of the plurality of UEs and the UE by adding the TA values of the plurality of UEs to the received signal timings of the response signals and subtracting the TA value of the UE.

13. The apparatus of claim 10, wherein the processor is further configured to identify a first UE having a greatest TA value, a second UE having a smallest TA value, and a third UE having a TA value between the greatest TA value and the smallest TA value from the UEs included in the identified set such that the triangular area covers the UE.

14. The apparatus of claim 10, wherein the response signal is transmitted from each of the plurality of UEs when a receive power of the broadcasted request signal received at each of the plurality of UEs is greater than a designated value, and
wherein the designated value is determined based on the TA value of the plurality of UEs.

15. The apparatus of claim 10, wherein the processor obtains the TA values of the UEs using device to device (D2D) signals from the plurality of UEs.

16. The apparatus of claim 10, wherein, when the UE is radio resource control (RRC)-idle, the processor is further configured to:
request a TA value from an evolved NodeB (eNB) which serves the UE, and
receive the TA value from the eNB.

17. The apparatus of claim 10, wherein, when the UE is RRC-idle, the processor is further configured to determine, as a TA value of the UE, a TA value of a signal having a highest reference signal received power (RSRP) among received device to device (D2D) signals.

18. An apparatus of a user equipment (UE), the apparatus comprising:
a transceiver; and
a processor operatively coupled with the transceiver, wherein the processor is configured to:
broadcast a device to device (D2D) discovery signal for positioning the UE,
receive, from the plurality of UEs, response signals corresponding to the D2D discovery signal,
identify a set among at least one UE set determined according to a distance between the UE and each of the plurality of UEs, the distances being determined based on a reference signal received power (RSRP) of the response signal,
identify three UEs among UEs included in the identified set, based on timing advance (TA) values for the UEs included in the identified set, such that a triangular area comprising the three UEs as vertices covers the UE, and
generate position information of the UE based on distances between the UE and each of the identified three UEs.

19. The method of claim 9, wherein the identifying of the three UEs comprises:
identifying a first UE having a greatest TA value among the TA values, a second UE having a smallest TA value among the TA values, and a third UE having a TA value between the greatest TA value and the smallest TA value, among the UEs included in the identified set such that the triangular area covers the UE.

20. The apparatus of claim 18, wherein the processor is further configured to identify a first UE having a greatest TA value among the TA values, a second UE having a smallest TA value among the TA values, and a third UE having a TA value between the greatest TA value and the smallest TA value, among the UEs included in the identified set such that the triangular area covers the UE.

* * * * *